US012234428B2

(12) United States Patent
Dreher et al.

(10) Patent No.: US 12,234,428 B2
(45) **Date of Patent: *Feb. 25, 2025**

(54) POUCHES COMPRISING WATER-SOLUBLE FIBROUS WALL MATERIALS AND METHODS FOR MAKING SAME

(71) Applicant: The Procter & Gamble Company, Cincinnati, OH (US)

(72) Inventors: Andreas Josef Dreher, Cincinnati, OH (US); Mark Robert Sivik, Mason, OH (US); Gregory Charles Gordon, Loveland, OH (US); Hailing Bao, Blue Ash, OH (US); Paul Dennis Trokhan, Hamilton, OH (US); Paul Thomas Weisman, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,663

(22) Filed: Dec. 4, 2019

(65) Prior Publication Data

US 2020/0102524 A1 Apr. 2, 2020

Related U.S. Application Data

(63) Continuation of application No. 14/476,823, filed on Sep. 4, 2014, now Pat. No. 10,526,570.

(Continued)

(51) Int. Cl.

*C11D 17/04* (2006.01)
*A61K 8/02* (2006.01)

(Continued)

(52) U.S. Cl.

CPC ............ *C11D 17/045* (2013.01); *B31B 70/74* (2017.08); *B65D 29/00* (2013.01); *C11D 17/042* (2013.01); *B31B 2160/20* (2017.08)

(58) Field of Classification Search

CPC .. C11D 17/045; C11D 17/042; A61K 8/0204; A61K 8/0216; A61K 8/0241; A61Q 5/02;

(Continued)

(56) References Cited

U.S. PATENT DOCUMENTS

| | | |
|---|---|---|
| 3,066,347 A | 12/1962 | Vosbikian et al. |
| 3,097,787 A | 7/1963 | Schur |

(Continued)

FOREIGN PATENT DOCUMENTS

| | | |
|---|---|---|
| CN | 1724725 A | 1/2006 |
| CN | 101151403 A | 3/2008 |

(Continued)

OTHER PUBLICATIONS

U.S. Appl. No. 14/476,823, filed Sep. 4, 2014, Dreher, et al.

(Continued)

*Primary Examiner* — Lorna M Douyon
(74) *Attorney, Agent, or Firm* — James E. Oehlenschlager

(57) ABSTRACT

Pouches, for example pouches that contain one or more active agents, such as a fabric care active agent or dishwashing active agent and/or detergent compositions, and more particularly pouches employing a water-soluble fibrous wall material, pouches employing a fibrous wall material that ruptures during use, and methods for making same, are provided.

17 Claims, 6 Drawing Sheets

Related U.S. Application Data

(60) Provisional application No. 61/874,533, filed on Sep. 6, 2013.

(51) Int. Cl.
*A61Q 5/02* (2006.01)
*A61Q 5/10* (2006.01)
*A61Q 5/12* (2006.01)
*A61Q 19/00* (2006.01)
*A61Q 19/10* (2006.01)
*B31B 70/74* (2017.01)
*B65D 30/00* (2006.01)
*B31B 160/20* (2017.01)

(58) Field of Classification Search
CPC . A61Q 5/10; A61Q 5/12; A61Q 19/00; A61Q 19/10
See application file for complete search history.

(56) References Cited

U.S. PATENT DOCUMENTS 3,823,816 A 7/1974 Controulis et al.
3,994,771 A 11/1976 Morgan, Jr. et al.
4,155,971 A 5/1979 Wysong
4,188,304 A 2/1980 Clarke et al.
4,555,354 A 11/1985 Clarke
4,588,630 A 5/1986 Shimalla
4,637,859 A 1/1987 Trokhan
4,741,941 A 5/1988 Englebert
4,762,738 A 8/1988 Keyes et al.
4,776,455 A 10/1988 Anderson et al.
4,806,261 A * 2/1989 Ciallella .............. C11D 17/044 510/471
4,820,435 A 4/1989 Zafiroglu
4,839,076 A 6/1989 Willman et al.
4,876,023 A 10/1989 Dickenson
5,053,270 A 10/1991 Mack
5,160,654 A 11/1992 Falou et al.
5,518,730 A 5/1996 Fuisz
5,534,178 A 7/1996 Bailly et al.
5,780,418 A 7/1998 Niinaka
5,801,141 A 9/1998 Steber et al.
5,958,334 A 9/1999 Haddon
6,270,623 B1 8/2001 Goda et al.
6,486,095 B1 11/2002 Fujita et al.
6,713,441 B1 3/2004 Desenna
6,793,856 B2 9/2004 Hartmann et al.
6,818,606 B1 11/2004 Hanada
6,955,850 B1 10/2005 Cabell et al.
7,226,899 B2 6/2007 Cole
7,285,520 B2 10/2007 Krzysik
7,595,290 B2 9/2009 Pounds et al.
8,250,837 B2 8/2012 Tanguy et al.
8,551,929 B2 10/2013 Graham et al.
8,754,022 B2 6/2014 Zhang et al.
8,980,816 B2 3/2015 Dreher et al.
9,139,802 B2 9/2015 Weisman et al.
10,376,125 B2 8/2019 Dreher et al.
10,526,570 B2 * 1/2020 Dreher ................... B65D 29/00
10,792,229 B2 10/2020 Pratt et al.
11,697,904 B2 7/2023 Pratt et al.
11,697,905 B2 7/2023 Glassmeyer et al.
11,697,906 B2 7/2023 Weisman et al.
2002/0025215 A1 2/2002 Duden et al.
2002/0077264 A1 * 6/2002 Roberts ................ C11D 17/045 510/296
2002/0132746 A1 9/2002 Desenna et al.
2002/0169092 A1 11/2002 Alexandre et al.
2003/0049326 A1 3/2003 Nimni
2003/0065297 A1 4/2003 Davis
2003/0080150 A1 5/2003 Cowan et al.
2003/0203196 A1 10/2003 Trokhan
2004/0144681 A1 7/2004 Wiedemann et al.
2005/0217045 A1 10/2005 Minkler et al.
2005/0250667 A1 11/2005 Quellet et al.
2005/0282725 A1 12/2005 Dasque et al.
2006/0005333 A1 1/2006 Catalfamo et al.
2006/0037724 A1 2/2006 Akai et al.
2006/0075253 A1 4/2006 Sonkin et al.
2006/0213801 A1 9/2006 Karaoren
2006/0243630 A1 11/2006 Bourgoin et al.
2007/0071537 A1 3/2007 Reddy et al.
2008/0004198 A1 1/2008 Joinson
2008/0132438 A1 6/2008 Hoffman et al.
2008/0160286 A1 7/2008 Asrar et al.
2008/0177241 A1 7/2008 Hasse et al.
2008/0242572 A1 10/2008 Icht
2009/0181587 A1 7/2009 Kang
2009/0214140 A1 8/2009 Jacobson
2009/0287034 A1 11/2009 Siggelkow
2009/0306277 A1 12/2009 Goenner et al.
2010/0018641 A1 1/2010 Branham et al.
2010/0029377 A1 2/2010 Canterbury et al.
2010/0115708 A1 5/2010 Caswell et al.
2010/0158987 A1 6/2010 Lehrke
2010/0294678 A1 11/2010 Arnold
2010/0297377 A1 11/2010 Mcneil et al.
2011/0028373 A1 2/2011 Fossum et al.
2011/0033509 A1 2/2011 Simon
2011/0129510 A1 6/2011 Liebmann
2011/0135587 A1 * 6/2011 Kinoshita .............. A61K 8/416 424/70.28
2011/0207646 A1 8/2011 Baez et al.
2011/0250256 A1 10/2011 Hyun-oh et al.
2011/0301070 A1 12/2011 Ochomogo
2012/0021026 A1 1/2012 Glenn, Jr.
2012/0027838 A1 2/2012 Gordon et al.
2012/0036733 A1 2/2012 Dehn
2012/0052036 A1 3/2012 Glenn, Jr.
2012/0052037 A1 3/2012 Sivik et al.
2012/0053103 A1 3/2012 Sivik
2012/0053106 A1 3/2012 Labeque
2012/0053107 A1 3/2012 Labeque et al.
2012/0053108 A1 * 3/2012 Glenn, Jr. ................. D01F 1/10 510/298
2012/0121316 A1 5/2012 Brown et al.
2012/0121669 A1 5/2012 Fontana et al.
2012/0121674 A1 5/2012 Pedoja
2012/0237576 A1 9/2012 Gordon
2013/0017421 A1 1/2013 Onnerud et al.
2013/0053293 A1 2/2013 Dituro et al.
2013/0142852 A1 6/2013 Tojo et al.
2013/0167305 A1 7/2013 Weisman et al.
2013/0171421 A1 7/2013 Weisman
2013/0172226 A1 7/2013 Dreher et al.
2013/0216789 A1 8/2013 Kraus et al.
2013/0256182 A1 10/2013 Petrovicova et al.
2013/0259918 A1 10/2013 Lehrke
2013/0273277 A1 * 10/2013 Lee ........................ C11D 3/505 428/35.2
2013/0292273 A1 11/2013 Sekiba et al.
2013/0302566 A1 11/2013 Barnholtz et al.
2014/0086965 A1 * 3/2014 Dihora ................... A61Q 15/00 510/513
2014/0228194 A1 8/2014 Kepinski et al.
2014/0238889 A1 8/2014 Sunder et al.
2014/0271848 A1 9/2014 Guido et al.
2014/0336029 A1 11/2014 Mirle et al.
2014/0356521 A1 12/2014 Oku et al.
2014/0371411 A1 12/2014 Dipietro
2015/0004197 A1 1/2015 Doerr et al.
2015/0071572 A1 3/2015 Dreher
2015/0125574 A1 5/2015 Arent et al.
2015/0136636 A1 5/2015 Sunder et al.
2015/0136637 A1 5/2015 Meier et al.
2015/0158645 A1 6/2015 Meier
2015/0159082 A1 6/2015 Lee et al.
2015/0190543 A1 7/2015 Marshall et al.
2016/0101026 A1 4/2016 Pratt et al.
2016/0101204 A1 4/2016 Lynch et al.
2016/0251131 A1 9/2016 Edwards
2016/0251148 A1 9/2016 Edwards

(56) References Cited

U.S. PATENT DOCUMENTS

| | | | |
|---|---|---|---|
| 2016/0258083 | A1 | 9/2016 | Weisman et al. |
| 2016/0355950 | A1 | 12/2016 | Young et al. |
| 2016/0374906 | A1 | 12/2016 | Sivik et al. |
| 2017/0233175 | A1 | 8/2017 | Keuleers et al. |
| 2017/0275563 | A1 | 9/2017 | Federle |
| 2017/0342617 | A1 | 11/2017 | Castillo |
| 2017/0362124 | A1 | 12/2017 | Sang et al. |
| 2018/0105766 | A1 | 4/2018 | Caparrós Casco |
| 2018/0216285 | A1 | 8/2018 | Pratt et al. |
| 2018/0216286 | A1 | 8/2018 | Glassmeyer |
| 2018/0216287 | A1 | 8/2018 | Weisman |
| 2018/0216288 | A1 | 8/2018 | Weisman et al. |
| 2018/0362905 | A1 | 12/2018 | Catlin et al. |
| 2019/0233781 | A1 | 8/2019 | Huang et al. |
| 2019/0233970 | A1 | 8/2019 | Reed |
| 2019/0233974 | A1 | 8/2019 | Reed |
| 2020/0115833 | A1 | 4/2020 | Joseph et al. |
| 2020/0190446 | A1 | 6/2020 | Sivik et al. |
| 2023/0058562 | A1 | 2/2023 | Weisman et al. |
| 2023/0304216 | A1 | 9/2023 | Pratt et al. |
| 2023/0313445 | A1 | 10/2023 | Glassmeyer et al. |
| 2023/0357984 | A1 | 11/2023 | Weisman et al. |

FOREIGN PATENT DOCUMENTS

| | | | | |
|---|---|---|---|---|
| CN | 103556250 | A | 2/2014 | |
| CN | 104271818 | A | 1/2015 | |
| DE | 20 2008 007644 | U1 | 10/2008 | |
| DE | 202009017112 | U1 | 4/2010 | |
| EP | 0095335 | A1 | 11/1983 | |
| EP | 0178029 | A2 | 4/1986 | |
| EP | 0293139 | A2 | 11/1988 | |
| EP | 0904933 | A2 | 3/1999 | |
| EP | 1 543 763 | A1 | 6/2005 | |
| EP | 2003239 | A1 | 12/2008 | |
| EP | 2088187 | A1 | 8/2009 | |
| EP | 3549758 | A1 | 10/2019 | |
| FR | 2985272 | A1 | 7/2013 | |
| GB | 1473147 | A | 5/1977 | |
| GB | 2 254 857 | A | 10/1992 | |
| JP | S61231210 | A | 10/1986 | |
| JP | H01292185 | A | 11/1989 | |
| JP | H0453900 | A | 2/1992 | |
| JP | H06228876 | A | 8/1994 | |
| JP | H07329983 | A | 12/1995 | |
| JP | H0940023 | A | 2/1997 | |
| JP | H09216809 | A | 8/1997 | |
| JP | H108098 | A | 1/1998 | |
| JP | H1072600 | A | 3/1998 | |
| JP | H11206661 | A | 8/1999 | |
| JP | H11335303 | A | 12/1999 | |
| JP | 2000248466 | A | 9/2000 | |
| JP | 2000290899 | A | 10/2000 | |
| JP | 2001146629 | A | 5/2001 | |
| JP | 2004075672 | A | 3/2004 | |
| JP | 2005504895 | A | 2/2005 | |
| JP | 2006109984 | A | 4/2006 | |
| JP | 2008155566 | A | 7/2008 | |
| JP | 2012082568 | A | 4/2012 | |
| JP | 2012112052 | A | 6/2012 | |
| JP | 2013139337 | A | 7/2013 | |
| JP | 2017149695 | A | 8/2017 | |
| KR | 20100089367 | A | 8/2010 | |
| KR | 20110017263 | A | 2/2011 | |
| RU | 2343900 | C2 | 1/2009 | |
| RU | 2011109018 | A | 9/2012 | |
| RU | 2489989 | C1 | 8/2013 | |
| WO | 9220594 | A1 | 11/1992 | |
| WO | 9315701 | A1 | 8/1993 | |
| WO | 9516470 | A1 | 6/1995 | |
| WO | 9720098 | A1 | 6/1997 | |
| WO | 0010539 | A1 | 3/2000 | |
| WO | 0022218 | A1 | 4/2000 | |
| WO | 02056728 | A1 | 7/2002 | |
| WO | 03044153 | A1 | 5/2003 | |
| WO | 03084836 | A1 | 10/2003 | |
| WO | WO-2005087043 | A1 * | 9/2005 | ............. A45D 44/00 |
| WO | 2005035857 | A3 | 11/2005 | |
| WO | 2006136771 | A1 | 12/2006 | |
| WO | 2007090818 | A1 | 8/2007 | |
| WO | 2008020246 | A2 | 2/2008 | |
| WO | 2010065683 | A1 | 6/2010 | |
| WO | 2010065684 | A1 | 6/2010 | |
| WO | 2011053677 | A1 | 5/2011 | |
| WO | 2011153023 | A1 | 12/2011 | |
| WO | 2012003316 | A1 | 1/2012 | |
| WO | 2012003351 | A2 | 1/2012 | |
| WO | 2012003360 | A2 | 1/2012 | |
| WO | 2012003365 | A1 | 1/2012 | |
| WO | 2013103626 | A1 | 7/2013 | |
| WO | 2013103629 | A1 | 7/2013 | |
| WO | 2013103630 | A1 | 7/2013 | |
| WO | 2013126531 | A1 | 8/2013 | |
| WO | 2016057353 | A1 | 4/2016 | |
| WO | 2016057376 | A1 | 4/2016 | |
| WO | 2018140432 | A1 | 8/2018 | |
| WO | 2018140472 | A1 | 8/2018 | |
| WO | 2018140669 | A1 | 8/2018 | |
| WO | 2019147523 | A1 | 8/2019 | |
| WO | 2020123888 | A1 | 6/2020 | |

OTHER PUBLICATIONS

U.S. Appl. No. 14/476,831, filed Sep. 4, 2014, Dreher, et al.
Search Report dated May 23, 2019—2 pages.
Search Report dated Dec. 2, 2014—10 pages.
Search Report dated Nov. 13, 2014—5 pages.
All Office Actions, U.S. Appl. No. 15/058,191, (see at least office action dated Jun. 7, 2021).
All Office Actions; U.S. Appl. No. 14/476,823, (see at least office action dated Aug. 29, 2019).
All Office Actions; U.S. Appl. No. 14/476,831, (see at least office action dated Apr. 17, 2020).
All Office Actions; U.S. Appl. No. 14/879,131, (see at least office action dated Jun. 30, 2021).
All Office Actions; U.S. Appl. No. 14/879,154, (see at least office action dated Sep. 16, 2020).
All Office Actions; U.S. Appl. No. 16/250,455, (see at least office action dated Aug. 25, 2021).
All Office Actions; U.S. Appl. No. 16/250,484, (see at least office action dated May 11, 2021).
Anonymous, "Aversive-flacored Inkjet and laserjet printing fabric(s) to prevent injury to children", Research Disclosure, Mason Publications, Hamshire, GB, vol. 434, No. 35, dated Jun. 1, 2000, 2 pages.
Database WPI Week 199002, Thomson Scientific, London, GB;AN 1990-011767, XP002757711, 2 pages.
Database WPI Week 199437 Thomson Scientific , London, GB; AN 1994-300331, XP0O2757712, 2 pages.
Database WPI Week 200067, Thomson Scientific , London, GB;AN 2000-682013, XPO02757716 ; 3 pages.
Database WPI Week 200148, Thomson Scientific, London, GB;AN 2001-446066, XP002757710; 2 pages.
Database WPI Week 201079, Thomson Scientific , London, GB;AN 2O10-K40521, XP0O2757714; 2 pages.
Database WPI Week 201156 Thomson Scientific , London, GB;AN 2011-C10272, XPO02757713; 1 pages.
Database WPI Week 201242, Thomson Scientific , London, GB;AN 2012-G86009, XP002757715; 2 pages.
Lewis K, An assessment of four solvents for the recovery of 2-chlorobenzylidenemalononitrile and capsaicins from "CS" and "Pepper" type lachrymator sprays, and an examination of their persistence on cotton fabric. J Forensic Sci 2001 ; vol. 46, No. 2, pp. 352-355.
VaporTec, "Advantages of Continuous Flow Production", dated 2016; pp. 1-5.
"Merriam Webster", Online retrieved from "https://www.merriam-webster.com/dictionary/handle";2020; 02 pages.
All Office Actions; U.S. Appl. No. 16/713,130, filed Dec. 13, 2019.

(56) References Cited

OTHER PUBLICATIONS

All Office Actions; U.S. Appl. No. 18/430,852, filed Feb. 2, 2024.
Collins Dictionary (https://www.collinsdictionary.com/dictionary/english/ply), page visited on Oct. 4, 2021) 14 pages.
Unpublished U.S. Appl. No. 18/430,852, filed Feb. 2, 2024, to Anthony Edward Reed et. al.
All Office Actions; U.S. Appl. No. 18/751,747, filed Jun. 24, 2024.
All Office Actions; U.S. Appl. No. 18/751,784, filed Jun. 24, 2024.
All Office Actions; U.S. Appl. No. 18/751,942, filed Jun. 24, 2024.
U.S. Appl. No. 18/751,747, filed Jun. 24, 2024, to Stephen Robert Glassmeyer et al.
U.S. Appl. No. 18/751,784, filed Jun. 24, 2024, to Paul Thomas Weisman et al.
U.S. Appl. No. 18/751,942, filed Jun. 24, 2024, to Michael Sean Pratt et al.
All Office Actions; U.S. Appl. No. 17/392,327, filed Aug. 3, 2021.
All Office Actions; U.S. Appl. No. 18/203,871, filed May 31, 2023.
All Office Actions; U.S. Appl. No. 18/203,895, filed May 31, 2023.
All Office Actions; U.S. Appl. No. 18/203,885, filed May 31, 2023.

* cited by examiner

POUCHES COMPRISING WATER-SOLUBLE FIBROUS WALL MATERIALS AND METHODS FOR MAKING SAME

FIELD OF THE INVENTION

The present invention relates to pouches, for example pouches that contain one or more active agents, such as a fabric care active agent and/or dishwashing active agent and/or detergent compositions, and more particularly to pouches comprising a water-soluble fibrous wall material, pouches comprising fibrous wall materials that rupture during use, and methods for making same.

BACKGROUND OF THE INVENTION

Pouches comprising detergent compositions and/or liquid compositions have been made in the past with porous water-insoluble fibrous wall materials. These water-insoluble fibrous wall materials were coated with a water-soluble composition that dissolves to release the pouch's contents through the pores of the water-insoluble fibrous wall materials rather than the pouch literally rupturing open (for example degrading, dissolving, and/or breaking apart) during use to release its contents. Further, use of such water-insoluble wall materials without the coating could lead to premature loss of the pouch's contents through the open pores of the water-insoluble fibrous wall materials.

One problem with such known pouches is the water-insolubility of their fibrous wall materials, which results in the fibrous wall material remaining after use. The remaining water-insoluble fibrous wall material can attach to whatever articles are being cleaned making use of the pouches an unpleasant experience for consumers. Also, a pouch's water-insoluble fibrous wall material presents a disposal problem or task after its use as it needs to be discarded in a solid waste stream.

Accordingly, there exists a need for a pouch made from a water-soluble fibrous wall material and methods for making same. Further, there exists a need for a pouch made from a water-soluble fibrous wall material and methods for making same wherein the pouch exhibits a rapid release of its contents under conditions of intended use. Further yet, there exists a need for a pouch made from a water-soluble fibrous wall material and methods for making the same that does not compromise the containment of materials and particulate matter within the pouch during distribution and handling. There also exists a need for a pouch made from an apertured, water-soluble fibrous wall material and methods for making same where there is containment of materials and particulate matter from the pouch during distribution and handling. Lastly, there is a need for a pouch made from a water-soluble fibrous wall material and methods for making same that provides for release of fragrances and scents during storage and use of the pouches.

SUMMARY OF THE INVENTION

The present invention fulfills the needs described above by providing novel pouches that comprise a water-soluble fibrous wall material and methods for making same.

One solution to the problem described above is a pouch comprising a water-soluble fibrous wall material made from fibrous elements comprising a fibrous element-forming polymer, for example a hydroxyl polymer, that ruptures during use to release its contents as measured according to the Rupture Test Method described herein and/or retains its contents sufficiently after being subjected to the Shake Test Method described herein.

In one example of the present invention, a unit dose product, such as a pouch, comprising a water-soluble fibrous wall material, is provided.

In another example of the present invention, a pouch comprising a pouch wall that defines an internal volume of the pouch containing one or more active agents, wherein the pouch wall comprises a fibrous wall material, such as a water-soluble fibrous wall material, and wherein the pouch ruptures when exposed to conditions of intended use, such as during use, to release one or more of its active agents, is provided.

In another example of the present invention, a pouch comprising a pouch wall that defines an internal volume of the pouch containing one or more active agents, wherein the pouch wall comprises a fibrous wall material, such as a water-soluble fibrous wall material, that ruptures as measured according to the Rupture Test Method described herein is provided.

In yet another example of the present invention, a pouch comprising a water-soluble fibrous wall material, wherein the water-soluble fibrous wall material comprises one or more, for example a plurality of fibrous elements, for example filaments, wherein at least one of the fibrous elements comprising one or more filament-forming materials and one or more active agents present within the fibrous element, is provided.

In yet another example of the present invention, a pouch comprising a fibrous wall material, wherein the fibrous wall material comprises a plurality of fibrous elements wherein at least one of the fibrous elements comprising one or more filament-forming materials and one or more active agents present within the fibrous element, is provided.

In even another example of the present invention, a pouch comprising a fibrous wall material, such as a water soluble fibrous wall material, that defines an internal volume of the pouch containing one or more active agents, wherein the pouch exhibits a % Weight Loss of less than 10% as measured according to the Shake Test Method described herein is provided.

In even another example of the present invention, a pouch comprising an apertured fibrous wall material that defines an internal volume of the pouch containing one or more active agents, wherein the pouch exhibits a % Weight Loss of less than 10% as measured according to the Shake Test Method described herein is provided.

In even yet another example of the present invention, a pouch comprising a fibrous wall material that defines an internal volume of the pouch containing one or more perfume agents that are released from the pouch is provided.

In even yet another example of the present invention, a pouch comprising an apertured fibrous wall material that defines an internal volume of the pouch containing one or more perfume agents that are released from the pouch is provided.

In still yet another example of the present invention, a method for making a pouch according to the present invention comprising the steps of:

a. providing a fibrous wall material, such as a water-soluble fibrous wall material; and
b. forming a pouch defining an internal volume from the fibrous wall material, is provided.

In still yet another example of the present invention, a method for making a pouch comprising the steps of:

a. providing a fibrous wall material comprising a plurality of fibrous elements, wherein at least one of the fibrous elements comprises one or more filament-forming materials and one or more active agents present within the fibrous element; and
b. forming a pouch defining an internal volume from the fibrous wall material, is provided.

In still another example of the present invention, a method for making a pouch according to the present invention comprising the steps of:

a. providing a fibrous wall material, such as a water-soluble fibrous wall material;
b. creating a plurality of holes in the fibrous wall material to form an apertured fibrous wall material; and
c. forming a pouch defining an internal volume from the apertured fibrous wall material, is provided.

In even still another example of the present invention, a method for treating a fabric article in need of treatment, the method comprising the step of treating the fabric article with a pouch according to the present invention, for example contacting the fabric article with a wash liquor formed by adding a pouch to water, is provided.

In even still another example of the present invention, a method for treating a dish in need of treatment, the method comprising the step of treating the dish with a pouch according to the present invention, for example contacting the dish with a wash liquor formed by adding a pouch to water, is provided.

In even still another example of the present invention, a method for treating a toilet bowl in need of treatment, the method comprising the step of treating the toilet bowl with a pouch according to the present invention, for example contacting the toilet bowl with a cleaning liquor formed by adding a pouch to water, is provided.

As evidenced above, the present invention provides pouches comprising water-soluble fibrous wall materials and methods for making same that overcome the negatives associated with known water-insoluble fibrous wall material pouches.

DETAILED DESCRIPTION OF THE INVENTION

Definitions

"Pouch wall material" as used herein means a material that forms one or more of the walls of a pouch such that an internal volume of the pouch is defined and enclosed, at least partially or entirely by the pouch wall material.

Figure 1:
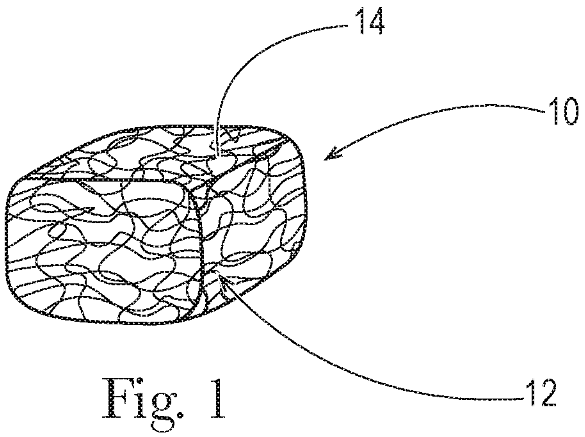
FIG. 1 is a schematic representation of an example of a pouch according to the present invention.
Figure 2:
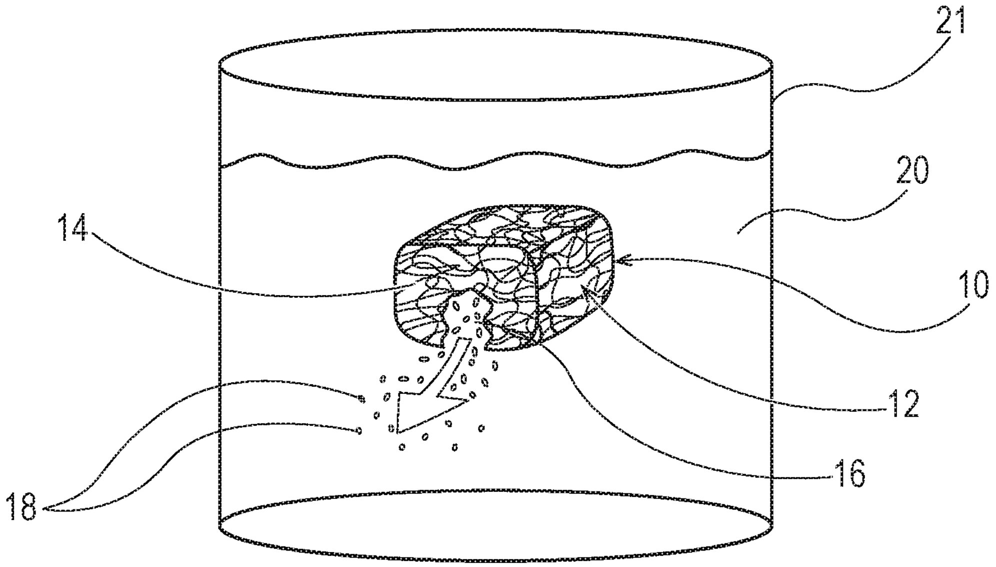
FIG. 2 is a schematic representation of the pouch of FIG. 1 during use.
Figure 3:
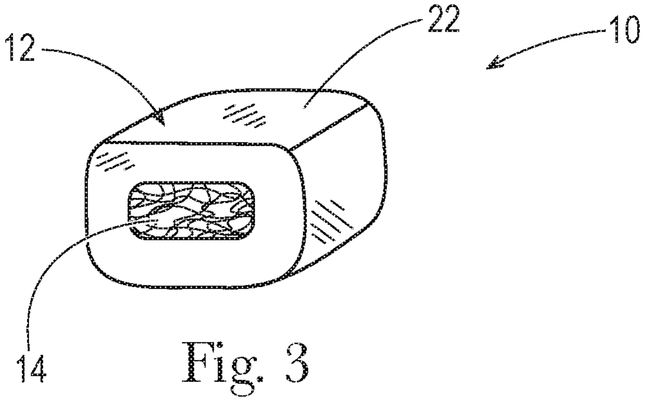
FIG. 3 is a schematic representation of another example of a pouch according to the present invention.
Figure 4:
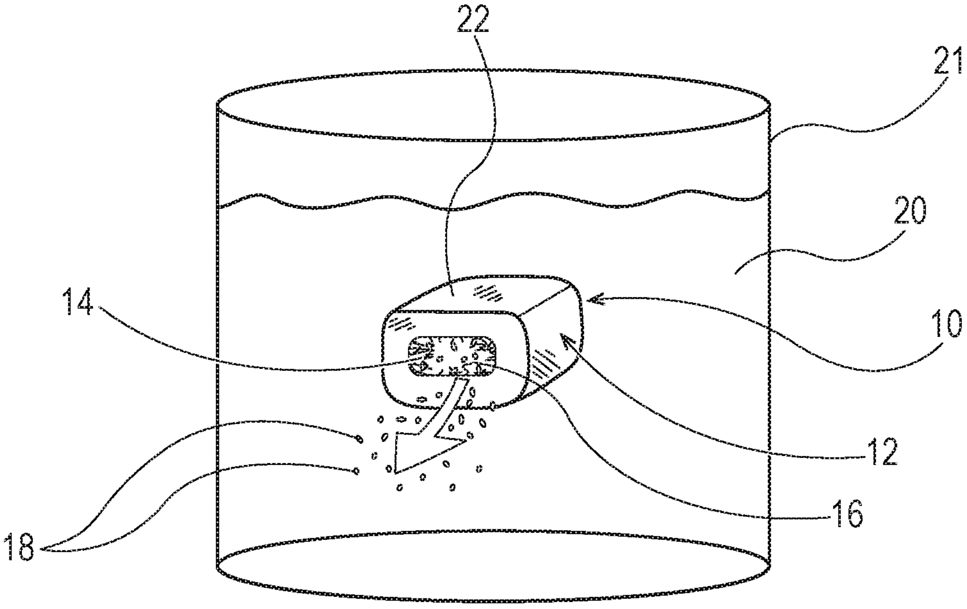
FIG. 4 is a schematic representation of the pouch of FIG. 3 during use.

"Fibrous wall material" as used herein means that the pouch wall material at least partially includes fibrous elements, for example filaments, such as inter-entangled filaments in the form of a fibrous structure. In one example, the fibrous wall material makes up greater than 5% and/or greater than 10% and/or greater than 20% and/or greater than 50% and/or greater than 70% and/or greater than 90% and/or 100% of the total surface area of the pouch. A pouch comprising a fibrous wall material that covers 100% or about 100% of the pouch's total surface area is illustrated in FIGS. 1 and 2. It is understood that any edge seams on the pouch may comprise film or film-like portions as a result of fusing/sealing the fibrous pouch wall together. In another example, the fibrous wall material makes up less than 100% and/or less than 70% and/or less than 50% and/or less than 20% and/or less than 10% of the total surface area of the pouch. A pouch comprising a fibrous wall material that covers less than 100% of the pouch's total surface area is illustrated in FIGS. 3 and 4.

The fibrous wall material comprises a plurality of fibrous elements. In one example, the fibrous wall material comprises two or more and/or three or more different fibrous elements.

The fibrous wall materials of the present invention may be homogeneous or may be layered. If layered, the fibrous wall materials may comprise at least two and/or at least three and/or at least four and/or at least five layers.

The fibrous wall material and/or fibrous elements, for example filaments, making up the fibrous wall material may comprise one or more active agents, for example a fabric care active agent, a dishwashing active agent, a hard surface active agent, and mixtures thereof. In one example, a fibrous wall material of the present invention comprises one or more surfactants, one or more enzymes (such as in the form of an enzyme prill), one or more perfumes and/or one or more suds suppressors. In another example, a fibrous wall material of the present invention comprises a builder and/or a chelating agent. In another example, a fibrous wall material of the present invention comprises a bleaching agent (such as an encapsulated bleaching agent).

In one example, the fibrous wall material is a water-soluble fibrous wall material.

In one example, the fibrous wall material exhibits a basis weight of less than 5000 $g/m^2$ and/or less than 4000 $g/m^2$ and/or less than 2000 $g/m^2$ and/or less than 1000 $g/m^2$ and/or less than 500 $g/m^2$ as measured according to the Basis Weight Test Method described herein.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from a filament-forming compositions also referred to as fibrous element-forming compositions via suitable spinning process operations, such as meltblowing, spunbonding, electro-spinning, and/or rotary spinning.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include staple fibers produced by spinning a filament or filament tow of the present invention and then cutting the filament or filament tow into segments of less than 5.08 cm (2 in.) thus producing fibers.

In one example, one or more fibers may be formed from a filament of the present invention, such as when the filaments are cut to shorter lengths (such as less than 5.08 cm in length). Thus, in one example, the present invention also includes a fiber made from a filament of the present invention, such as a fiber comprising one or more filament-forming materials and one or more additives, such as active agents. Therefore, references to filament and/or filaments of the present invention herein also include fibers made from such filament and/or filaments unless otherwise noted. Fibers are typically considered discontinuous in nature relative to filaments, which are considered continuous in nature.

"Filament-forming composition" and/or "fibrous element-forming composition" as used herein means a composition that is suitable for making a fibrous element of the present invention such as by meltblowing and/or spunbonding. The filament-forming composition comprises one or more filament-forming materials, for example filament-forming polymers, that exhibit properties that make them suitable for spinning into a fibrous element. In one example, the filament-forming material comprises a polymer, for example a hydroxyl polymer and/or a water-soluble polymer. In addition to one or more filament-forming materials, the filament-forming composition may comprise one or more additives, for example one or more active agents. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

One or more additives, for example one or more active agents, may be present in the fibrous elements, for example filament, rather than on the fibrous element, such as a coating composition comprising one or more active agents, which may be the same or different from the active agents in the fibrous elements. The total level of filament-forming materials and total level of active agents present in the filament-forming composition may be any suitable amount so long as the fibrous elements of the present invention are produced therefrom.

In one example, one or more active agents may be present in the fibrous element and one or more additional active agents, may be present on a surface of the fibrous element. In another example, a fibrous element of the present invention may comprise one or more active agents that are present in the fibrous element when originally made, but then bloom to a surface of the fibrous element prior to and/or when exposed to conditions of intended use of the fibrous element.

"Filament-forming material" as used herein means a material, such as a polymer or monomers capable of producing a polymer that exhibits properties suitable for making a fibrous element. In one example, the filament-forming material comprises one or more substituted polymers such as an anionic, cationic, zwitterionic, and/or nonionic polymer. In another example, the polymer may comprise a hydroxyl polymer, such as a polyvinyl alcohol ("PVOH"), a partially hydrolyzed polyvinyl acetate and/or a polysaccharide, such as starch and/or a starch derivative, such as an ethoxylated starch and/or acid-thinned starch, carboxymethylcellulose, hydroxypropyl cellulose, hydroxyethyl cellulose. In another example, the polymer may comprise polyethylenes and/or terephthalates. In yet another example, the filament-forming material is a polar solvent-soluble material.

"Particle" as used herein means a solid additive, such as a powder, granule, encapsulate, microcapsule, and/or prill. In one example, the particle exhibits a median particle size of 1600 μm or less as measured according to the Median Particle Size Test Method described herein. In another example, the particle exhibits a median particle size of from about 1 μm to about 1600 μm and/or from about 1 μm to about 800 μm and/or from about 5 μm to about 500 μm and/or from about 10 μm to about 300 μm and/or from about 10 μm to about 100 μm and/or from about 10 μm to about 50 μm and/or from about 10 μm to about 30 μm as measured according to the Median Particle Size Test Method described herein. The shape of the particle can be in the form of spheres, rods, plates, tubes, squares, rectangles, discs, stars, fibers or have regular or irregular random forms.

"Additive" as used herein means any material present in the fibrous element of the present invention that is not a filament-forming material. In one example, an additive comprises an active agent. In another example, an additive comprises a processing aid. In still another example, an additive comprises a filler. In one example, an additive comprises any material present in the fibrous element that its absence from the fibrous element would not result in the fibrous element losing its fibrous element structure, in other words, its absence does not result in the fibrous element losing its solid form. In another example, an additive, for example an active agent, comprises a non-polymer material.

In another example, an additive may comprise a plasticizer for the fibrous element. Non-limiting examples of suitable plasticizers for the present invention include polyols, copolyols, polycarboxylic acids, polyesters and dimethicone copolyols. Examples of useful polyols include, but are not limited to, glycerin, diglycerin, propylene glycol, ethylene glycol, butylene glycol, pentylene glycol, cyclohexane dimethanol, hexanediol, 2,2,4-trimethylpentane-1,3-diol, polyethylene glycol (200-600), pentaerythritol, sugar alcohols such as sorbitol, manitol, lactitol and other mono- and polyhydric low molecular weight alcohols (e.g., C2-C8 alcohols); mono di- and oligo-saccharides such as fructose, glucose, sucrose, maltose, lactose, high fructose corn syrup solids, and dextrins, and ascorbic acid.

In one example, the plasticizer includes glycerin and/or propylene glycol and/or glycerol derivatives such as propoxylated glycerol. In still another example, the plasticizer is selected from the group consisting of glycerin, ethylene glycol, polyethylene glycol, propylene glycol, glycidol, urea, sorbitol, xylitol, maltitol, sugars, ethylene bisformamide, amino acids, and mixtures thereof In another example, an additive may comprise a rheology modifier, such as a shear modifier and/or an extensional modifier. Non-limiting examples of rheology modifiers include but not limited to polyacrylamide, polyurethanes and polyacrylates that may be used in the fibrous elements of the present invention. Non-limiting examples of rheology modifiers are commercially available from The Dow Chemical Company (Midland, MI).

In yet another example, an additive may comprise one or more colors and/or dyes that are incorporated into the fibrous elements of the present invention to provide a visual signal when the fibrous elements are exposed to conditions of intended use and/or when an active agent is released from the fibrous elements and/or when the fibrous element's morphology changes.

In still yet another example, an additive may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates, fatty amide, silicones, aminosilicones, fluoropolymers, and mixtures thereof. In one example, the release agents and/or lubricants may be applied to the fibrous element, in other words, after the fibrous element is formed. In one example, one or more release agents/lubricants may be applied to the fibrous element prior to collecting the fibrous elements on a collection device to form a fibrous wall material. In another example, one or more release agents/lubricants may be applied to a fibrous wall material formed from the fibrous elements of the present invention prior to contacting one or more fibrous wall materials, such as in a stack of fibrous wall materials. In yet another example, one or more release agents/lubricants may be applied to the fibrous element of the present invention and/or fibrous wall material comprising the fibrous element prior to the fibrous element and/or fibrous wall material contacting a surface, such as a surface of equipment used in a processing system so as to facilitate removal of the fibrous element and/or fibrous wall material and/or to avoid layers of fibrous elements and/or plies of fibrous wall materials of the present invention sticking to one another, even inadvertently. In one example, the release agents/lubricants comprise particulates.

In even still yet another example, an additive may comprise one or more anti-blocking and/or detackifying agents. Non-limiting examples of suitable anti-blocking and/or detackifying agents include starches, starch derivatives, crosslinked polyvinylpyrrolidone, crosslinked cellulose, microcrystalline cellulose, silica, metallic oxides, calcium carbonate, talc, mica, and mixtures thereof.

"Conditions of intended use" as used herein means the temperature, physical, chemical, and/or mechanical conditions that a pouch and/or its fibrous wall material of the present invention is exposed to when the pouch and/or its fibrous wall material is used for one or more of its designed purposes. For example, if a pouch and/or its fibrous wall material comprising a fibrous element is designed to be used in a washing machine for laundry care purposes, the conditions of intended use will include that temperature, chemical, physical and/or mechanical conditions present in a washing machine, including any wash water, during a laundry washing operation. In another example, if a pouch and/or its fibrous wall material comprising a fibrous element is designed to be used by a human as a shampoo for hair care purposes, the conditions of intended use will include that temperature, chemical, physical and/or mechanical conditions present during the shampooing of the human's hair. Likewise, if a pouch and/or its fibrous wall material comprising a fibrous element is designed to be used in a dishwashing operation, by hand or by a dishwashing machine, the conditions of intended use will include the temperature, chemical, physical and/or mechanical conditions present in dishwashing water and/or a dishwashing machine, during the dishwashing operation.

"Active agent" as used herein means an additive that produces an intended effect in an environment external to a pouch and/or its fibrous wall material comprising a fibrous element of the present invention, such as when the pouch and/or its fibrous wall material is exposed to conditions of intended use. In one example, an active agent comprises an additive that treats a surface, such as a hard surface (i.e., kitchen countertops, bath tubs, toilets, toilet bowls, sinks, floors, walls, teeth, cars, windows, mirrors, dishes) and/or a soft surface (i.e., fabric, hair, skin, carpet, crops, plants). In another example, an active agent comprises an additive that creates a chemical reaction (i.e., foaming, fizzing, coloring, warming, cooling, lathering, disinfecting and/or clarifying and/or chlorinating, such as in clarifying water and/or disinfecting water and/or chlorinating water). In yet another example, an active agent comprises an additive that treats an environment (i.e., deodorizes, purifies, perfumes air). In one example, the active agent is formed in situ, such as during the formation of the fibrous element and/or particle containing the active agent, for example the fibrous element and/or particle may comprise a water-soluble polymer (e.g., starch) and a surfactant (e.g., anionic surfactant), which may create a polymer complex or coacervate that functions as the active agent used to treat fabric surfaces.

"Treats" as used herein with respect to treating a surface or an environment means that the active agent provides a benefit to a surface or environment. Treats includes regulating and/or immediately improving a surface's or environment's appearance, cleanliness, smell, purity and/or feel. In one example treating in reference to treating a keratinous tissue surface (for example skin and/or hair) surface means regulating and/or immediately improving the keratinous tissue surface's cosmetic appearance and/or feel. For instance, "regulating skin, hair, or nail (keratinous tissue surface) condition" includes: thickening of skin, hair, or nails (e.g, building the epidermis and/or dermis and/or sub-dermal [e.g., subcutaneous fat or muscle] layers of the skin, and where applicable the keratinous layers of the nail and hair shaft) to reduce skin, hair, or nail atrophy, increasing the convolution of the dermal-epidermal border (also known as the rete ridges), preventing loss of skin or hair elasticity (loss, damage and/or inactivation of functional skin elastin) such as elastosis, sagging, loss of skin or hair recoil from deformation; melanin or non-melanin change in coloration to the skin, hair, or nails such as under eye circles, blotching (e.g., uneven red coloration due to, e.g., rosacea) (hereinafter referred to as “red blotchiness”), sallowness (pale color), discoloration caused by telangiectasia or spider vessels, and graying hair.

In another example, treating means removing stains, soils, and/or odors from fabric articles, such as clothes, towels, linens, and/or hard surfaces, such as countertops and/or dishware including pots and pans.

“Fabric care active agent” as used herein means an active agent that when applied to a fabric article provides a benefit and/or improvement to the fabric article. Non-limiting examples of benefits and/or improvements to a fabric article include cleaning (for example by surfactants), stain removal, stain reduction, wrinkle removal, color restoration, static control, wrinkle resistance, permanent press, wear reduction, wear resistance, pill removal, pill resistance, soil removal, soil resistance (including soil release), shape retention, shrinkage reduction, softness, fragrance, anti-bacterial, anti-viral, odor resistance, and odor removal.

“Dishwashing active agent” as used herein means an active agent that when applied to dishware, glassware, pots, pans, utensils, and/or cooking sheets provides a benefit and/or improvement to the dishware, glassware, plastic items, pots, pans and/or cooking sheets. Non-limiting examples of benefits and/or improvements to the dishware, glassware, plastic items, pots, pans, utensils, and/or cooking sheets include food and/or soil removal, cleaning (for example by surfactants) stain removal, stain reduction, grease removal, water spot removal and/or water spot prevention, glass and metal care, sanitization, shining, and polishing.

“Hard surface active agent” as used herein means an active agent when applied to floors, countertops, sinks, windows, mirrors, showers, baths, and/or toilets provides a benefit and/or improvement to the floors, countertops, sinks, windows, mirrors, showers, baths, and/or toilets. Non-limiting examples of benefits and/or improvements to the floors, countertops, sinks, windows, mirrors, showers, baths, and/or toilets include food and/or soil removal, cleaning (for example by surfactants), stain removal, stain reduction, grease removal, water spot removal and/or water spot prevention, limescale removal, disinfection, shining, polishing, and freshening.

“Weight ratio” as used herein means the ratio between two materials on their dry basis. For example, the weight ratio of filament-forming materials to active agents within a fibrous element is the ratio of the weight of filament-forming material on a dry weight basis (g or %) in the fibrous element to the weight of additive, such as active agent(s) on a dry weight basis (g or % — same units as the filament-forming material weight) in the fibrous element. In another example, the weight ratio of particles to fibrous elements within a fibrous wall material is the ratio of the weight of particles on a dry weight basis (g or %) in the fibrous wall material to the weight of fibrous elements on a dry weight basis (g or % — same units as the particle weight) in the fibrous wall material.

“Water-soluble” and/or “water-soluble material” as used herein means a material that is miscible in water. In other words, a material that is capable of forming a stable (does not separate for greater than 5 minutes after forming the homogeneous solution) homogeneous solution with water at ambient conditions.

“Ambient conditions” as used herein means 23° C.±1.0° C. and a relative humidity of 50%±2%.

“Weight average molecular weight” as used herein means the weight average molecular weight as determined using gel permeation chromatography according to the protocol found in Colloids and Surfaces A. Physico Chemical & Engineering Aspects, Vol. 162, 2000, pg. 107-121.

“Length” as used herein, with respect to a fibrous element, means the length along the longest axis of the fibrous element from one terminus to the other terminus. If a fibrous element has a kink, curl or curves in it, then the length is the length along the entire path of the fibrous element from one terminus to the other terminus.

“Diameter” as used herein, with respect to a fibrous element, is measured according to the Diameter Test Method described herein. In one example, a fibrous element of the present invention exhibits a diameter of less than 100 μm and/or less than 75 μm and/or less than 50 μm and/or less than 25 μm and/or less than 20 μm and/or less than 15 μm and/or less than 10 μm and/or less than 6 μm and/or greater than 1 μm and/or greater than 3 μm.

“Triggering condition” as used herein in one example means anything, as an act or event, that serves as a stimulus and initiates or precipitates a change in the pouch of the present invention and/or its fibrous wall material, such as a loss or altering of the pouch’s fibrous wall material’s physical structure and/or a release of an additive, such as an active agent from the pouch. In another example, the triggering condition may be present in an environment, such as water, when a pouch of the present invention is added to the water. In other words, nothing changes in the water except for the fact that the pouch of the present invention is present therein.

“Morphology changes” as used herein with respect to a pouch’s fibrous wall material’s fibrous element’s morphology changing means that the fibrous element experiences a change in its physical structure. Non-limiting examples of morphology changes for a fibrous element of the present invention include dissolution, melting, swelling, shrinking, breaking into pieces, exploding, lengthening, shortening, and combinations thereof. The fibrous elements of the present invention may completely or substantially lose their fibrous element physical structure or they may have their morphology changed or they may retain or substantially retain their fibrous element physical structure as they are exposed to conditions of intended use.

“By weight on a dry fibrous element basis” and/or “by weight on a dry fibrous wall material basis” and/or “by weight on a dry pouch basis” means the weight of the fibrous element and/or fibrous wall material and/or pouch measured on a balance with at least four decimal places within 15 seconds after being subjected to drying in a forced air oven on top of foil for 24 hours at 70° C.±2° C. at a relative humidity of 4%±2%. The measurement occurs in a conditioned room at 23° C.±1.0° C. and a relative humidity of 50%±2%.

In one example, a dry fibrous element and/or dry fibrous wall material and/or dry pouch comprises less than 20% and/or less than 15% and/or less than 10% and/or less than 7% and/or less than 5% and/or less than 3% and/or to 0% and/or to greater than 0% based on the dry weight of the fibrous element and/or fibrous wall material and/or pouch of moisture, such as water, for example free water, as measured according to the Water Content Test Method described herein. In one example, the pouch exhibits a water content of from 0% to 20% as measured according to the Water Content Test Method described herein.

“Total level” as used herein, for example with respect to the total level of one or more active agents present in the fibrous element and/or fibrous wall material, means the sum of the weights or weight percent of all of the subject materials, for example active agents. In other words, a fibrous element and/or fibrous wall material may comprise 25% by weight on a dry fibrous element basis and/or dry fibrous wall material basis of an anionic surfactant, 15% by weight on a dry fibrous element basis and/or dry fibrous wall material basis of a nonionic surfactant, 10% by weight of a chelant on a dry fibrous element basis and/or dry fibrous wall material basis, and 5% by weight of a perfume a dry fibrous element basis and/or dry fibrous wall material basis so that the total level of active agents present in the fibrous element and/or particle and/or fibrous wall material is greater than 50%; namely 55% by weight on a dry fibrous element basis and/or dry fibrous wall material basis.

"Different from" or "different" as used herein means, with respect to a material, such as a fibrous element as a whole and/or a filament-forming material within a fibrous element and/or an active agent within a fibrous element, that one material, such as a fibrous element and/or a filament-forming material and/or an active agent, is chemically, physically and/or structurally different from another material, such as a fibrous element and/or a filament-forming material and/or an active agent. For example, a filament-forming material in the form of a filament is different from the same filament-forming material in the form of a fiber. Likewise, starch is different from cellulose. However, different molecular weights of the same material, such as different molecular weights of a starch, are not different materials from one another for purposes of the present invention.

"Random mixture of polymers" as used herein means that two or more different filament-forming materials are randomly combined to form a fibrous element. Accordingly, two or more different filament-forming materials that are orderly combined to form a fibrous element, such as a core and sheath bicomponent fibrous element, is not a random mixture of different filament-forming materials for purposes of the present invention.

"Associate," "Associated," "Association," and/or "Associating" as used herein with respect to fibrous elements and/or particle means combining, either in direct contact or in indirect contact, fibrous elements and/or particles such that a fibrous wall material is formed. In one example, the associated fibrous elements and/or particles may be bonded together for example by adhesives and/or thermal bonds. In another example, the fibrous elements and/or particles may be associated with one another by being deposited onto the same fibrous wall material making belt and/or patterned belt.

"Apertured fibrous wall material" as used herein means that the pouch wall material comprises a plurality of holes, for example more than 2 and/or more than 3 and/or more than 4 and/or more than 5. Film pouches that comprise a single hole for degassing of its contents are known and they are not "apertured" within the meaning of the present invention.

"Machine Direction" or "MD" as used herein means the direction parallel to the flow of the fibrous wall material through the fibrous wall material making machine.

"Cross Machine Direction" or "CD" as used herein means the direction perpendicular to the machine direction in the same plane of the fibrous wall material.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Pouch

As shown in FIGS. 1 and 2, an example of a pouch 10 of the present invention comprises a pouch wall material 12, such as a fibrous wall material 14, for example a water-soluble fibrous wall material. The pouch wall material 12 defines an internal volume 16 of the pouch 10. Any contents 18 of the pouch 10, for example active agents in the form of powder, laundry detergent compositions, dishwashing compositions, and other cleaning compositions, may be contained and retained in the internal volume 16 of the pouch 10 at least until the pouch 10 ruptures, for example during use and it releases its contents as shown in FIG. 2.

A pouch 10 under conditions of intended use is represented in FIG. 2. FIG. 2 illustrates the scenario when a user adds the pouch 10 to a liquid 20, such as water, in a container 21 to create a wash liquor, such as when a user adds the pouch 10 to a washing machine and/or to a dishwashing machine. As shown in FIG. 2, when the pouch 10 contacts the liquid 20 the pouch 10 ruptures, such as by part of the fibrous pouch wall material 14 dissolving, causing at least a portion if not all of its contents 18 to be released from the internal volume 16 of the pouch 10.

Another example of a pouch 10 is shown in FIGS. 3 and 4 comprises a pouch wall material 12 comprising a fibrous wall material 14, such as a water-soluble fibrous wall material, that covers less than 100% of the total surface area of the pouch 10, and a film wall material 22, such as a water-soluble film wall material, for example a film wall material comprising a hydroxyl polymer, that covers the remainder, less than 100% of the total surface area of the pouch 10. In one example, the film wall material 22 comprises a hydroxyl polymer of the present invention.

A pouch 10 under conditions of intended use is represented in FIG. 4. FIG. 4 illustrates the scenario when a user adds the pouch 10 to a liquid 20, such as water, in a container 21 to create a wash liquor, such as when a user adds the pouch 10 to a washing machine and/or to a dishwashing machine. As shown in FIG. 4, when the pouch 10 contacts the liquid 20 the pouch 10 ruptures, such as by part of the fibrous pouch wall material 14 dissolving, causing at least a portion if not all of its contents 18 to be released from the internal volume 16 of the pouch 10.

As shown above, a fibrous wall material may form one or more sides of the pouch and a film wall material may form one or more other sides of the pouch. In still another example, a water-soluble pouch wall material, such as a water-soluble fibrous wall material may form one or more sides of the pouch and a water-insoluble fibrous wall material may form one more other sides of the pouch.

Figure 5:
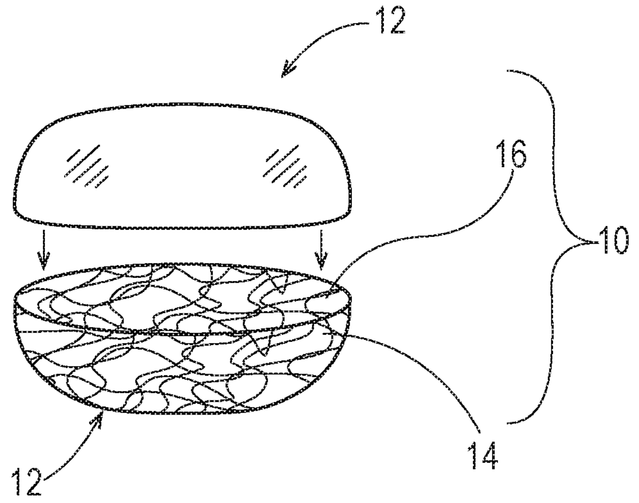
FIG. 5 is a schematic representation of another example of a pouch according to the present invention.

FIG. 5 illustrates another example of a pouch 10 of the present invention. The pouch 10 comprises a pouch wall material 12 comprising a fibrous wall material 14, for example a water-soluble fibrous wall material, that forms an open pouch 10 by being configured such that the internal volume 16 is partially defined by the fibrous wall material 14. An additional pouch wall material 12, such as an additional fibrous wall material and/or an additional film wall material may be associated with the fibrous wall material 14 to further define the internal volume 16 by producing a closed pouch. The additional pouch wall material 12 may be bonded, such as sealed, to the fibrous wall material 14 thus trapping any contents (not shown) in the internal volume 16 of the pouch 10.

In one example, the pouch of the present invention may be a single compartment pouch as illustrated in FIGS. 1-5.

Figure 6:
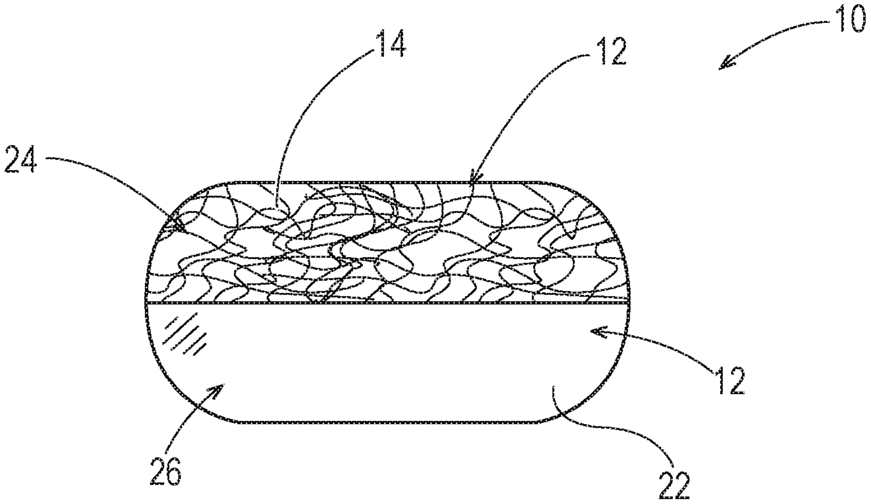
FIG. 6 is a schematic representation of an example of a multi-compartment pouch according to the present invention.

In another example as shown in FIG. 6, the pouch 10 of the present invention may be a multi-compartment pouch 10 where the pouch 10 comprises two or more compartments 24, 26 that may contain different active agents and/or different compositions and/or the same active agents and/or the same compositions. For example, one compartment 24 may contain a fast dissolving active agent and another compartment 26 may contain a slower dissolving active agent relative to the fast dissolving active agent. In still another example, each of the compartments 24, 26 may comprise different pouch wall materials 12 that dissolve at different rates such that the contents (not shown) of the different compartments 24, 26 are released from their respective compartments 24, 26 at different times during use. This staggered release profile could be used if incompatible materials are contained in the different compartments 20, 22. As shown in FIG. 6, one of the compartments 24 may comprise a fibrous wall material 14, such as a water-soluble fibrous wall material, and the other compartment 26 may comprise a film wall material 22, such as a water-soluble film wall material. In even another example, a powder composition, such as a powder detergent composition, may be contained in compartment 24 and a liquid composition, such as a liquid detergent composition, may be contained in compartment 26.

In one example, the pouch of the present invention further comprises a discrete inner pouch present in the internal volume of the outer pouch. The inner pouch may comprise a film wall material and/or a fibrous wall material that defines a second internal volume. In one example, the inner pouch comprises an apertured film wall material. In another example, the inner pouch comprises a non-apertured film wall material. The inner pouch's second internal volume may comprise one or more active agents which may be the same or different from any active agents present in the outer pouch's internal volume.

In another example, an article of manufacture comprising two or more pouches wherein at least one of the pouches is contained within another of the pouches is provided by the present invention.

In one example, the inner pouch exhibits an Average Rupture Time equal to or greater than the Average Rupture Time of the outer pouch as measured according to the Rupture Test Method described herein.

Figure 7:
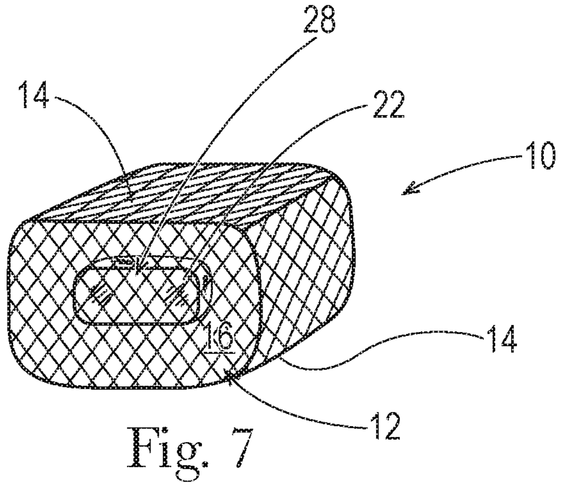
FIG. 7 is a schematic representation of another example of a pouch according to the present invention.
Figure 8:
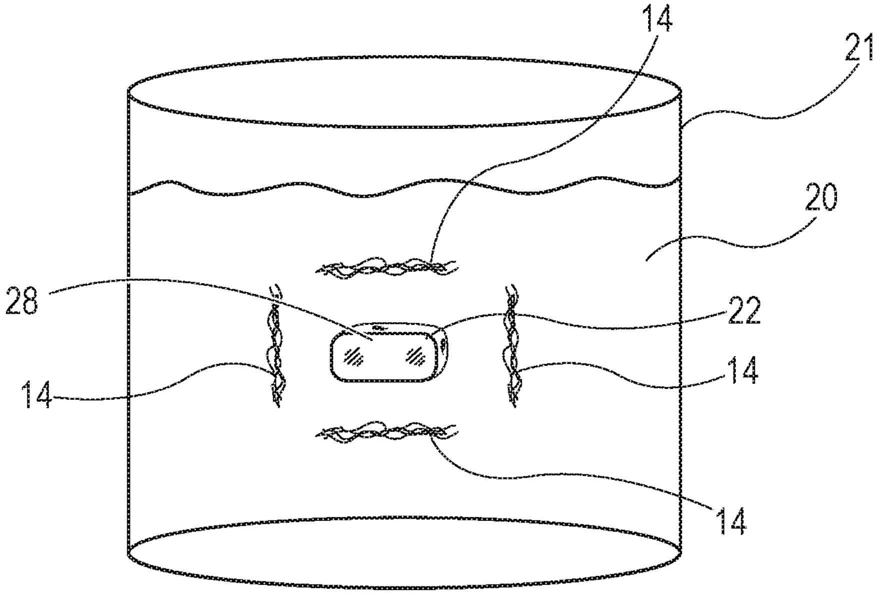
FIG. 8 is a schematic representation of the pouch of FIG. 7 during use.

In yet another example of the present invention, as shown in FIGS. 7 and 8, the pouch 10 may comprise a pouch wall material 12 comprising a fibrous wall material 14 that defines an internal volume 16 that contains one or more additional pouches, for example a film pouch 28 comprising a film wall material 22, such as a water-soluble film wall material, and/or a fibrous wall material pouch and/or fibrous wall materials and/or film materials. In addition to the film pouch 28, fibrous wall material pouch and/or fibrous wall materials and/or film materials, for example, the pouch 10 may comprise further contents such as powder detergent compositions and/or one or more active agents. Further, the film pouch 28 and/or fibrous wall material pouch may themselves contain one or more active agents, such as enzymes, and/or pouches within their internal volumes. The film pouch 28 and/or fibrous wall material pouch may comprise one or more active agents, for example powder detergent compositions and/or liquid detergent compositions and/or active agents. The film pouch 28 and/or fibrous wall material pouch is released upon the dissolution and/or rupturing of pouch 10, such as during use. The contents of pouch 10 and the contents of film pouch 28 and/or fibrous wall material pouch may be the same or different. In another example, the additional pouch(es) within pouch 10 may comprise a fibrous wall material and/or a combination of film wall material and fibrous wall material.

In one example the pouch 10 of the present invention may be in the form of a multi-ply, for example 2-ply, fibrous wall material structure that appears more like a web than known pouches. In this form, the multi-ply fibrous wall material structure may be at least partially bonded and/or sealed around its perimeter and unbounded and/or sealed on its interior such that an internal volume in between the multi-ply fibrous wall material structure. The internal volume may itself comprise one or more active agents and/or one or more fibrous wall materials and/or film materials and/or smaller multi-ply fibrous wall material structures capable of being housed within the internal volume that may have a void internal volume themselves or may themselves contain one or more active agents, for example enzymes.

A pouch 10 under conditions of intended use is represented in FIG. 8. FIG. 8 illustrates the scenario when a user adds the pouch 10 to a liquid 20, such as water, in a container 21 to create a wash liquor, such as when a user adds the pouch 10 to a washing machine and/or to a dishwashing machine. As shown in FIG. 8, when the pouch 10 contacts the liquid 20 the pouch 10 ruptures, such as by part of the fibrous pouch wall material 14 dissolving, causing at least a portion if not all of its contents 18, for example the film pouch 28, to be released from the internal volume 16 of the pouch 10.

The pouch of the present invention may be of any shape and size so long as it is suitable for its intended use.

In one example, the water-soluble fibrous wall material may exhibit a uniform or substantially uniform thickness throughout the pouch.

In one example, holes may be punched into pouch wall materials using any suitable process and/or equipment, for example a needle punching needle with a thickness of 0.6 mm. Holes may be punched into a 1 $cm^2$ area in the center of the rounded part (powder side) of each pouch. Each hole may be punched in a way that the needle completely penetrates the pouch wall material.

In another example, the pouches of the present invention may exhibit a % Weight Loss of less than 10% and/or less than 5% and/or less than 3% and/or less than 1% and/or less than 0.5% and/or less than 0.1% and/or less than 0.05% and/or less than 0.025% and/or less than 0.01% and/or about 0% as measured according to the Shake Test Method described herein.

Table 1 below shows the % Weight Loss as measured according to the Shake Test Method described herein of examples of pouches of the present invention.

TABLE 1

| Sample | Apertured? # holes added | % Weight Loss |
|---|---|---|
| Inventive Pouch 1 | No - None | <0.05% |
| Inventive Pouch 2 | Yes - 20 | <0.05% |

In one example, the pouch of the present invention comprising a fibrous wall material, for example a water-soluble fibrous wall material, exhibits an Average Rupture Time of less than 240 seconds and/or less than 120 seconds and/or less than 60 seconds and/or less than 30 seconds and/or less than 10 seconds and/or less than 5 seconds and/or less than 2 seconds and/or instantaneous as measured according to the Rupture Test Method described herein.

Table 2 below shows the Average Rupture Time as measured according to the Rupture Test Method described herein of examples of pouches of the present invention.

TABLE 2

| Sample | Fibrous and/ or Film wall Material? | Apertured? # holes added | Average Rupture Time (seconds) |
|---|---|---|---|
| Inventive Pouch 1 | Fibrous (water-soluble) | No - None | Instantaneous |
| Inventive Pouch 2 | Fibrous (water-soluble) | Yes - 20 | Instantaneous |

Fibrous Wall Material

The fibrous wall material of the present invention comprises a plurality of fibrous elements, for example a plurality of filaments. In one example, the plurality of fibrous filaments are inter-entangled to form a fibrous structure.

In one example of the present invention, the fibrous wall material is a water-soluble fibrous wall material.

In another example of the present invention, the fibrous wall material is an apertured fibrous wall material.

Even though the fibrous element and/or fibrous wall material of the present invention are in solid form, the filament-forming composition used to make the fibrous elements of the present invention may be in the form of a liquid.

In one example, the fibrous wall material comprises a plurality of identical or substantially identical from a compositional perspective of fibrous elements according to the present invention. In another example, the fibrous wall material may comprise two or more different fibrous elements according to the present invention. Non-limiting examples of differences in the fibrous elements may be physical differences such as differences in diameter, length, texture, shape, rigidness, elasticity, and the like; chemical differences such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. In one example, two or more fibrous elements and/or particles within the fibrous wall material may comprise different active agents. This may be the case where the different active agents may be incompatible with one another, for example an anionic surfactant (such as a shampoo active agent) and a cationic surfactant (such as a hair conditioner active agent).

In another example, the fibrous wall material may exhibit different regions, such as different regions of basis weight, density, and/or caliper. In yet another example, the fibrous wall material may comprise texture on one or more of its surfaces. A surface of the fibrous wall material may comprise a pattern, such as a non-random, repeating pattern. The fibrous wall material may be embossed with an emboss pattern.

In one example, the water-soluble fibrous wall material is a water-soluble fibrous wall material comprising a plurality of apertures. The apertures may be arranged in a non-random, repeating pattern.

Apertures within the apertured, water-soluble fibrous wall material may be of virtually any shape and size, as long as the apertured, water-soluble fibrous wall material provides the function of defining at least a portion of a pouch's internal volume. In one example, the apertures within the apertured, water-soluble fibrous wall materials are generally round or oblong shaped, in a regular pattern of spaced apart openings. The apertures can each have a diameter of from about 0.1 to about 2 mm and/or from about 0.5 to about 1 mm. The apertures may form an open area within an apertured, water-soluble fibrous wall material of from about 0.5% to about 25% and/or from about 1% to about 20% and/or from about 2% to about 10%. It is believed that the benefits of the present invention can be realized with non-repeating and/or non-regular patterns of apertures having various shapes and sizes.

In one example, openings (apertures) may be punched into pouch wall materials, prior to or after being formed into a pouch, using any suitable process and/or equipment, for example a needle punching needle with a diameter of about 0.6 mm. Openings (apertures) may be punched into about 1 $cm^2$ area in the center of the rounded part (powder side) of a pouch to form a pouch comprising an apertured, water-soluble fibrous wall material. Each hole may be punched in a way that the needle completely penetrates the water-soluble fibrous wall material. In another example, the pouch may comprise a water-soluble fibrous wall material comprising a region of openings (apertures)—an apertured region, and a region of no openings (no apertures)—a non-apertured region.

In another example, the fibrous wall material may comprise apertures. The apertures may be arranged in a non-random, repeating pattern. Aperturing of fibrous wall materials, for example water-soluble fibrous wall materials, can be accomplished by any number of techniques. For example, aperturing can be accomplished by various processes involving bonding and stretching, such as those described in U.S. Pat. Nos. 3,949,127 and 5,873,868. In one embodiment, the apertures may be formed by forming a plurality of spaced, melt stabilized regions, and then ring-rolling the web to stretch the web and form apertures in the melt stabilized regions, as described in U.S. Pat. Nos. 5,628,097 and 5,916,661, both of which are hereby incorporated by reference herein. In another embodiment, apertures can be formed in a multilayer, nonwoven configuration by the method described in U.S. Pat. Nos. 6,830,800 and 6,863,960 which are hereby incorporated herein by reference. Still another process for aperturing webs is described in U.S. Pat. No. 8,241,543 entitled "Method And Apparatus For Making An Apertured Web", which is hereby incorporated herein by reference.

In one example, the fibrous wall material may comprise discrete regions of fibrous elements that differ from other parts of the fibrous wall material.

The fibrous wall material of the present invention may be used as is or may be coated with one or more active agents.

In one example, the fibrous wall material of the present invention exhibits a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein.

In another example, the fibrous wall material of the present invention exhibits a Geometric Mean (GM) Tensile Strength of greater than 0.1 kN/m and/or greater than 0.25 kN/m and/or greater than 0.4 kN/m and/or greater than 0.45 kN/m and/or greater than 0.50 kN/m and/or greater than 0.75 kN/m as measured according to the Tensile Test Method described herein.

In another example, the fibrous wall material of the present invention exhibits a Geometric Mean (GM) Elongation at Break of less than 1000% and/or less than 800% and/or less than 650% and/or less than 550% and/or less than 500% and/or less than 475% as measured according to the Tensile Test Method described herein.

Table 3 shows the GM Tensile Strength and the GM Elongation of two examples of pouches of the present invention.

TABLE 3

| Sample | Apertured? # holes added | Geometric Mean Tensile Strength (kN/m) | Geometric Mean Elongation at Break (%) |
|---|---|---|---|
| Inventive Pouch 1 | No - None | 0.54 | 461.1% |
| Inventive Pouch 2 | Yes - 20 | 0.49 | 528.3% |

Fibrous Elements

The fibrous element, such as a filament and/or fiber, of the present invention comprises one or more filament-forming materials. In addition to the filament-forming materials, the fibrous element may further comprise one or more active agents present within the fibrous element that are releasable from the fibrous element, for example a filament, such as when the fibrous element and/or fibrous wall material comprising the fibrous element is exposed to conditions of intended use. In one example, the total level of the one or more filament-forming materials present in the fibrous element is less than 80% by weight on a dry fibrous element basis and/or dry fibrous wall material basis and the total level of the one or more active agents present in the fibrous element is greater than 20% by weight on a dry fibrous element basis and/or dry fibrous wall material basis.

In one example, the fibrous element of the present invention comprises about 100% and/or greater than 95% and/or greater than 90% and/or greater than 85% and/or greater than 75% and/or greater than 50% by weight on a dry fibrous element basis and/or dry fibrous wall material basis of one or more filament-forming materials. For example, the filament-forming material may comprise polyvinyl alcohol, starch, carboxymethylcellulose, and other suitable polymers, especially hydroxyl polymers.

In another example, the fibrous element of the present invention comprises one or more filament-forming materials and one or more active agents wherein the total level of filament-forming materials present in the fibrous element is from about 5% to less than 80% by weight on a dry fibrous element basis and/or dry fibrous wall material basis and the total level of active agents present in the fibrous element is greater than 20% to about 95% by weight on a dry fibrous element basis and/or dry fibrous wall material basis.

In one example, the fibrous element of the present invention comprises at least 10% and/or at least 15% and/or at least 20% and/or less than less than 80% and/or less than 75% and/or less than 65% and/or less than 60% and/or less than 55% and/or less than 50% and/or less than 45% and/or less than 40% by weight on a dry fibrous element basis and/or dry fibrous wall material basis of the filament-forming materials and greater than 20% and/or at least 35% and/or at least 40% and/or at least 45% and/or at least 50% and/or at least 60% and/or less than 95% and/or less than 90% and/or less than 85% and/or less than 80% and/or less than 75% by weight on a dry fibrous element basis and/or dry fibrous wall material basis of active agents.

In one example, the fibrous element of the present invention comprises at least 5% and/or at least 10% and/or at least 15% and/or at least 20% and/or less than 50% and/or less than 45% and/or less than 40% and/or less than 35% and/or less than 30% and/or less than 25% by weight on a dry fibrous element basis and/or dry fibrous wall material basis of the filament-forming materials and greater than 50% and/or at least 55% and/or at least 60% and/or at least 65% and/or at least 70% and/or less than 95% and/or less than 90% and/or less than 85% and/or less than 80% and/or less than 75% by weight on a dry fibrous element basis and/or dry fibrous wall material basis of active agents. In one example, the fibrous element of the present invention comprises greater than 80% by weight on a dry fibrous element basis and/or dry fibrous wall material basis of active agents.

In another example, the one or more filament-forming materials and active agents are present in the fibrous element at a weight ratio of total level of filament-forming materials to active agents of 4.0 or less and/or 3.5 or less and/or 3.0 or less and/or 2.5 or less and/or 2.0 or less and/or 1.85 or less and/or less than 1.7 and/or less than 1.6 and/or less than 1.5 and/or less than 1.3 and/or less than 1.2 and/or less than 1 and/or less than 0.7 and/or less than 0.5 and/or less than 0.4 and/or less than 0.3 and/or greater than 0.1 and/or greater than 0.15 and/or greater than 0.2.

In still another example, the fibrous element of the present invention comprises from about 10% and/or from about 15% to less than 80% by weight on a dry fibrous element basis and/or dry fibrous wall material basis of a filament-forming material, such as polyvinyl alcohol polymer, starch polymer, and/or carboxymethylcellulose polymer, and greater than 20% to about 90% and/or to about 85% by weight on a dry fibrous element basis and/or dry fibrous wall material basis of an active agent. The fibrous element may further comprise a plasticizer, such as glycerin and/or pH adjusting agents, such as citric acid.

In yet another example, the fibrous element of the present invention comprises from about 10% and/or from about 15% to less than 80% by weight on a dry fibrous element basis and/or dry fibrous wall material basis of a filament-forming material, such as polyvinyl alcohol polymer, starch polymer, and/or carboxymethylcellulose polymer, and greater than 20% to about 90% and/or to about 85% by weight on a dry fibrous element basis and/or dry fibrous wall material basis of an active agent, wherein the weight ratio of filament-forming material to active agent is 4.0 or less. The fibrous element may further comprise a plasticizer, such as glycerin and/or pH adjusting agents, such as citric acid.

In even another example of the present invention, a fibrous element comprises one or more filament-forming materials and one or more active agents selected from the group consisting of: enzymes, bleaching agents, builder, chelants, sensates, dispersants, and mixtures thereof that are releasable and/or released when the fibrous element and/or fibrous wall material comprising the fibrous element is exposed to conditions of intended use. In one example, the fibrous element comprises a total level of filament-forming materials of less than 95% and/or less than 90% and/or less than 80% and/or less than 50% and/or less than 35% and/or to about 5% and/or to about 10% and/or to about 20% by weight on a dry fibrous element basis and/or dry fibrous wall material basis and a total level of active agents selected from the group consisting of: enzymes, bleaching agents, builder, chelants, perfumes, antimicrobials, antibacterials, antifungals, and mixtures thereof of greater than 5% and/or greater than 10% and/or greater than 20% and/or greater than 35% and/or greater than 50% and/or greater than 65% and/or to about 95% and/or to about 90% and/or to about 80% by weight on a dry fibrous element basis and/or dry fibrous wall material basis. In one example, the active agent comprises one or more enzymes. In another example, the active agent comprises one or more bleaching agents. In yet another example, the active agent comprises one or more builders. In still another example, the active agent comprises one or more chelants. In still another example, the active agent comprises one or more perfumes. In even still another example, the active agent comprise one or more antimicrobials, antibacterials, and/or antifungals.

In yet another example of the present invention, the fibrous elements of the present invention may comprise active agents that may create health and/or safety concerns if they become airborne. For example, the fibrous element may be used to inhibit enzymes within the fibrous element from becoming airborne.

In one example, the fibrous elements of the present invention may be meltblown fibrous elements. In another example, the fibrous elements of the present invention may be spunbond fibrous elements. In another example, the fibrous elements may be hollow fibrous elements prior to and/or after release of one or more of its active agents.

The fibrous elements of the present invention may be hydrophilic or hydrophobic. The fibrous elements may be surface treated and/or internally treated to change the inherent hydrophilic or hydrophobic properties of the fibrous element.

In one example, the fibrous element exhibits a diameter of less than 100 μm and/or less than 75 μm and/or less than 50 μm and/or less than 25 μm and/or less than 10 μm and/or less than 5 μm and/or less than 1 μm as measured according to the Diameter Test Method described herein. In another example, the fibrous element of the present invention exhibits a diameter of greater than 1 μm as measured according to the Diameter Test Method described herein. The diameter of a fibrous element of the present invention may be used to control the rate of release of one or more active agents present in the fibrous element and/or the rate of loss and/or altering of the fibrous element's physical structure.

The fibrous element may comprise two or more different active agents. In one example, the fibrous element comprises two or more different active agents, wherein the two or more different active agents are compatible with one another. In another example, the fibrous element comprises two or more different active agents, wherein the two or more different active agents are incompatible with one another.

In one example, the fibrous element may comprise an active agent within the fibrous element and an active agent on an external surface of the fibrous element, such as an active agent coating on the fibrous element. The active agent on the external surface of the fibrous element may be the same or different from the active agent present in the fibrous element. If different, the active agents may be compatible or incompatible with one another.

In one example, one or more active agents may be uniformly distributed or substantially uniformly distributed throughout the fibrous element. In another example, one or more active agents may be distributed as discrete regions within the fibrous element. In still another example, at least one active agent is distributed uniformly or substantially uniformly throughout the fibrous element and at least one other active agent is distributed as one or more discrete regions within the fibrous element. In still yet another example, at least one active agent is distributed as one or more discrete regions within the fibrous element and at least one other active agent is distributed as one or more discrete regions different from the first discrete regions within the fibrous element.

Filament-Forming Material

The filament-forming material is any suitable material, such as a polymer or monomers capable of producing a polymer that exhibits properties suitable for making a filament, such as by a spinning process.

In one example, the filament-forming material may comprise a polar solvent-soluble material, such as an alcohol-soluble material and/or a water-soluble material.

In another example, the filament-forming material may comprise a non-polar solvent-soluble material.

In still another example, the filament-forming material may comprise a water-soluble material and be free (less than 5% and/or less than 3% and/or less than 1% and/or 0% by weight on a dry fibrous element basis and/or dry fibrous wall material basis) of water-insoluble materials.

In yet another example, the filament-forming material may be a film-forming material. In still yet another example, the filament-forming material may be synthetic or of natural origin and it may be chemically, enzymatically, and/or physically modified.

In even another example of the present invention, the filament-forming material may comprise a polymer selected from the group consisting of: polymers derived from acrylic monomers such as the ethylenically unsaturated carboxylic monomers and ethylenically unsaturated monomers, polyvinyl alcohol, polyvinylformamide, polyvinylamine, polyacrylates, polymethacrylates, copolymers of acrylic acid and methyl acrylate, polyvinylpyrrolidones, polyalkylene oxides, starch and starch derivatives, pullulan, gelatin, and cellulose derivatives (for example, hydroxypropylmethyl celluloses, methyl celluloses, carboxymethy celluloses).

In still another example, the filament-forming material may comprise a polymer selected from the group consisting of: polyvinyl alcohol, polyvinyl alcohol derivatives, starch, starch derivatives, cellulose derivatives, hemicellulose, hemicellulose derivatives, proteins, sodium alginate, hydroxypropyl methylcellulose, chitosan, chitosan derivatives, polyethylene glycol, tetramethylene ether glycol, polyvinyl pyrrolidone, hydroxymethyl cellulose, hydroxyethyl cellulose, carboxymethyl cellulose, and mixtures thereof.

In another example, the filament-forming material comprises a hydroxyl polymer selected from the group consisting of: pullulan, hydroxypropylmethyl cellulose, hydroxyethyl cellulose, hydroxypropyl cellulose, carboxymethylcellulose, sodium alginate, xanthan gum, tragacanth gum, guar gum, acacia gum, Arabic gum, polyacrylic acid, dextrin, pectin, chitin, collagen, gelatin, zein, gluten, soy protein, casein, polyvinyl alcohol, carboxylated polyvinyl alcohol, sulfonated polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

Water-Soluble Materials

Non-limiting examples of water-soluble materials include water-soluble polymers. The water-soluble polymers may be synthetic or natural original and may be chemically and/or physically modified. In one example, the polar solvent-soluble polymers exhibit a weight average molecular weight of at least 10,000 g/mol and/or at least 20,000 g/mol and/or at least 40,000 g/mol and/or at least 80,000 g/mol and/or at least 100,000 g/mol and/or at least 1,000,000 g/mol and/or at least 3,000,000 g/mol and/or at least 10,000,000 g/mol and/or at least 20,000,000 g/mol and/or to about 40,000,000 g/mol and/or to about 30,000,000 g/mol.

Non-limiting examples of water-soluble polymers include water-soluble hydroxyl polymers, water-soluble thermoplastic polymers, water-soluble biodegradable polymers, water-soluble non-biodegradable polymers and mixtures thereof. In one example, the water-soluble polymer comprises polyvinyl alcohol. In another example, the water-soluble polymer comprises starch. In yet another example, the water-soluble polymer comprises polyvinyl alcohol and starch. In yet another example, the water-soluble polymer comprises carboxymethyl cellulose. An yet in another example, the polymer comprise carboxymethyl cellulose and polyvinyl alcohol.

a. Water-Soluble Hydroxyl Polymers—

Non-limiting examples of water-soluble hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose derivatives such as cellulose ether and ester derivatives, cellulose copolymers, hemicellulose, hemicellulose derivatives, hemicellulose copolymers, gums, arabinans, galactans, proteins, carboxymethylcellulose, and various other polysaccharides and mixtures thereof.

In one example, a water-soluble hydroxyl polymer of the present invention comprises a polysaccharide.

"Polysaccharides" as used herein means natural polysaccharides and polysaccharide derivatives and/or modified polysaccharides. Suitable water-soluble polysaccharides include, but are not limited to, starches, starch derivatives, chitosan, chitosan derivatives, cellulose derivatives, hemicellulose, hemicellulose derivatives, gums, arabinans, galactans and mixtures thereof. The water-soluble polysaccharide may exhibit a weight average molecular weight of from about 10,000 to about 40,000,000 g/mol and/or greater than 100,000 g/mol and/or greater than 1,000,000 g/mol and/or greater than 3,000,000 g/mol and/or greater than 3,000,000 to about 40,000,000 g/mol.

The water-soluble polysaccharides may comprise non-cellulose and/or non-cellulose derivative and/or non-cellulose copolymer water-soluble polysaccharides. Such non-cellulose water-soluble polysaccharides may be selected from the group consisting of: starches, starch derivatives, chitosan, chitosan derivatives, hemicellulose, hemicellulose derivatives, gums, arabinans, galactans and mixtures thereof.

In another example, a water-soluble hydroxyl polymer of the present invention comprises a non-thermoplastic polymer.

The water-soluble hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol. Higher and lower molecular weight water-soluble hydroxyl polymers may be used in combination with hydroxyl polymers having a certain desired weight average molecular weight.

Well known modifications of water-soluble hydroxyl polymers, such as natural starches, include chemical modifications and/or enzymatic modifications. For example, natural starch can be acid-thinned, hydroxy-ethylated, hydroxy-propylated, and/or oxidized. In addition, the water-soluble hydroxyl polymer may comprise dent corn starch.

Naturally occurring starch is generally a mixture of linear amylose and branched amylopectin polymer of D-glucose units. The amylose is a substantially linear polymer of D-glucose units joined by (1,4)-α-D links. The amylopectin is a highly branched polymer of D-glucose units joined by (1,4)-α-D links and (1,6)-α-D links at the branch points. Naturally occurring starch typically contains relatively high levels of amylopectin, for example, corn starch (64-80% amylopectin), waxy maize (93-100% amylopectin), rice (83-84% amylopectin), potato (about 78% amylopectin), and wheat (73-83% amylopectin). Though all starches are potentially useful herein, the present invention is most commonly practiced with high amylopectin natural starches derived from agricultural sources, which offer the advantages of being abundant in supply, easily replenishable and inexpensive.

As used herein, "starch" includes any naturally occurring unmodified starches, modified starches, synthetic starches and mixtures thereof, as well as mixtures of the amylose or amylopectin fractions; the starch may be modified by physical, chemical, or biological processes, or combinations thereof. The choice of unmodified or modified starch for the present invention may depend on the end product desired. In one embodiment of the present invention, the starch or starch mixture useful in the present invention has an amylopectin content from about 20% to about 100%, more typically from about 40% to about 90%, even more typically from about 60% to about 85% by weight of the starch or mixtures thereof.

Suitable naturally occurring starches can include, but are not limited to, corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches particularly, corn starch and wheat starch, are the desirable due to their economy and availability.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, maleic acid, itaconic acid, sodium vinylsulfonate, sodium allylsulfonate, sodium methylallyl sulfonate, sodium phenylallylether sulfonate, sodium phenylmethallylether sulfonate, 2-acrylamido-methyl propane sulfonic acid (AMPs), vinylidene chloride, vinyl chloride, vinyl amine and a variety of acrylate esters.

In one example, the water-soluble hydroxyl polymer is selected from the group consisting of: polyvinyl alcohols, hydroxymethylcelluloses, hydroxyethylcelluloses, hydroxypropylmethylcelluloses, carboxymethylcelluloses, and mixtures thereof. A non-limiting example of a suitable polyvinyl alcohol includes those commercially available from Sekisui Specialty Chemicals America, LLC (Dallas, TX) under the CELVOL® trade name. Another non-limiting example of a suitable polyvinyl alcohol includes G Polymer commercially available from Nippon Ghosei. A non-limiting example of a suitable hydroxypropylmethylcellulose includes those commercially available from the Dow Chemical Company (Midland, MI) under the METHOCEL® trade name including combinations with above mentioned polyvinyl alcohols.

b. Water-Soluble Thermoplastic Polymers—

Non-limiting examples of suitable water-soluble thermoplastic polymers include thermoplastic starch and/or starch derivatives, polylactic acid, polyhydroxyalkanoate, polycaprolactone, polyesteramides and certain polyesters, and mixtures thereof.

The water-soluble thermoplastic polymers of the present invention may be hydrophilic or hydrophobic. The water-soluble thermoplastic polymers may be surface treated and/or internally treated to change the inherent hydrophilic or hydrophobic properties of the thermoplastic polymer.

The water-soluble thermoplastic polymers may comprise biodegradable polymers.

Any suitable weight average molecular weight for the thermoplastic polymers may be used. For example, the weight average molecular weight for a thermoplastic polymer in accordance with the present invention is greater than about 10,000 g/mol and/or greater than about 40,000 g/mol and/or greater than about 50,000 g/mol and/or less than about 500,000 g/mol and/or less than about 400,000 g/mol and/or less than about 200,000 g/mol.

Active Agents

Active agents are a class of additives that are designed and intended to provide a benefit to something other than the fibrous element and/or particle and/or fibrous wall material itself, such as providing a benefit to an environment external to the fibrous element and/or particle and/or fibrous wall material. Active agents may be any suitable additive that produces an intended effect under intended use conditions of the fibrous element. For example, the active agent may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, antibacterial agents, antifungal agents, fabric hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, clay soil removing agents, anti-redeposition agents, polymeric soil release agents, polymeric dispersing agents, alkoxylated polyamine polymers, alkoxylated polycarboxylate polymers, amphilic graft copolymers, dissolution aids, buffering systems, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

Non-limiting examples of suitable cosmetic agents, skin care agents, skin conditioning agents, hair care agents, and hair conditioning agents are described in CTFA Cosmetic Ingredient Handbook, Second Edition, The Cosmetic, Toiletries, and Fragrance Association, Inc. 1988, 1992.

One or more classes of chemicals may be useful for one or more of the active agents listed above. For example, surfactants may be used for any number of the active agents described above. Likewise, bleaching agents may be used for fabric care, hard surface cleaning, dishwashing and even teeth whitening. Therefore, one of ordinary skill in the art will appreciate that the active agents will be selected based upon the desired intended use of the fibrous element and/or particle and/or fibrous wall material made therefrom.

For example, if the fibrous element and/or particle and/or fibrous wall material made therefrom is to be used for hair care and/or conditioning then one or more suitable surfactants, such as a lathering surfactant could be selected to provide the desired benefit to a consumer when exposed to conditions of intended use of the fibrous element and/or particle and/or fibrous wall material incorporating the fibrous element and/or particle.

In one example, if the fibrous element and/or particle and/or fibrous wall material made therefrom is designed or intended to be used for laundering clothes in a laundry operation, then one or more suitable surfactants and/or enzymes and/or builders and/or perfumes and/or suds suppressors and/or bleaching agents could be selected to provide the desired benefit to a consumer when exposed to conditions of intended use of the fibrous element and/or particle and/or fibrous wall material incorporating the fibrous element and/or particle. In another example, if the fibrous element and/or particle and/or fibrous wall material made therefrom is designed to be used for laundering clothes in a laundry operation and/or cleaning dishes in a dishwashing operation, then the fibrous element and/or particle and/or fibrous wall material may comprise a laundry detergent composition or dishwashing detergent composition or active agents used in such compositions. In still another example, if the fibrous element and/or particle and/or fibrous wall material made therefrom is designed to be used for cleaning and/or sanitizing a toilet bowl, then the fibrous element and/or particle and/or fibrous wall material made therefrom may comprise a toilet bowl cleaning composition and/or effervescent composition and/or active agents used in such compositions.

In one example, the active agent is selected from the group consisting of: surfactants, bleaching agents, enzymes, suds suppressors, suds boosting agents, fabric softening agents, denture cleaning agents, hair cleaning agents, hair care agents, personal health care agents, hueing agents, and mixtures thereof.

In one example, the pouch of the present invention comprises at least 5 g and/or at least 10 g and/or at least 15 g of active agents within its internal volume.

In another example, the pouch of the present invention comprises a bleaching agents, citric acid, and perfume.

Release of Active Agent

One or more active agents may be released from the fibrous element and/or particle and/or fibrous wall material when the fibrous element and/or particle and/or fibrous wall material is exposed to a triggering condition. In one example, one or more active agents may be released from the fibrous element and/or particle and/or fibrous wall material or a part thereof when the fibrous element and/or particle and/or fibrous wall material or the part thereof loses its identity, in other words, loses its physical structure. For example, a fibrous element and/or particle and/or fibrous wall material loses its physical structure when the filament-forming material dissolves, melts or undergoes some other transformative step such that its structure is lost. In one example, the one or more active agents are released from the fibrous element and/or particle and/or fibrous wall material when the fibrous element's and/or particle's and/or fibrous wall material's morphology changes.

In another example, one or more active agents may be released from the fibrous element and/or particle and/or fibrous wall material or a part thereof when the fibrous element and/or particle and/or fibrous wall material or the part thereof alters its identity, in other words, alters its physical structure rather than loses its physical structure. For example, a fibrous element and/or particle and/or fibrous wall material alters its physical structure when the filament-forming material swells, shrinks, lengthens, and/or shortens, but retains its filament-forming properties.

In another example, one or more active agents may be released from the fibrous element and/or particle and/or fibrous wall material with its morphology not changing (not losing or altering its physical structure).

In one example, the fibrous element and/or particle and/or fibrous wall material may release an active agent upon the fibrous element and/or particle and/or fibrous wall material being exposed to a triggering condition that results in the release of the active agent, such as by causing the fibrous element and/or particle and/or fibrous wall material to lose or alter its identity as discussed above. Non-limiting examples of triggering conditions include exposing the fibrous element and/or particle and/or fibrous wall material to solvent, a polar solvent, such as alcohol and/or water, and/or a non-polar solvent, which may be sequential, depending upon whether the filament-forming material comprises a polar solvent-soluble material and/or a non-polar solvent-soluble material; exposing the fibrous element and/or particle and/or fibrous wall material to heat, such as to a temperature of greater than 75° F. and/or greater than 100° F. and/or greater than 150° F. and/or greater than 200° F. and/or greater than 212° F.; exposing the fibrous element and/or particle and/or fibrous wall material to cold, such as to a temperature of less than 40° F. and/or less than 32° F. and/or less than 0° F.; exposing the fibrous element and/or particle and/or fibrous wall material to a force, such as a stretching force applied by a consumer using the fibrous element and/or particle and/or fibrous wall material; and/or exposing the fibrous element and/or particle and/or fibrous wall material to a chemical reaction; exposing the fibrous element and/or particle and/or fibrous wall material to a condition that results in a phase change; exposing the fibrous element and/or particle and/or fibrous wall material to a pH change and/or a pressure change and/or temperature change; exposing the fibrous element and/or particle and/or fibrous wall material to one or more chemicals that result in the fibrous element and/or particle and/or fibrous wall material releasing one or more of its active agents; exposing the fibrous element and/or particle and/or fibrous wall material to ultrasonics; exposing the fibrous element and/or particle and/or fibrous wall material to light and/or certain wavelengths; exposing the fibrous element and/or particle and/or fibrous wall material to a different ionic strength; and/or exposing the fibrous element and/or particle and/or fibrous wall material to an active agent released from another fibrous element and/or particle and/or fibrous wall material.

In one example, one or more active agents may be released from the fibrous elements and/or particles of the present invention when a fibrous wall material comprising the fibrous elements and/or particles is subjected to a triggering step selected from the group consisting of: pretreating stains on a fabric article with the fibrous wall material; forming a wash liquor by contacting the fibrous wall material with water; tumbling the fibrous wall material in a dryer; heating the fibrous wall material in a dryer; and combinations thereof.

Filament-Forming Composition

The fibrous elements of the present invention are made from a filament-forming composition. The filament-forming composition is a polar-solvent-based composition. In one example, the filament-forming composition is an aqueous composition comprising one or more filament-forming materials and one or more active agents.

The filament-forming composition of the present invention may have a shear viscosity as measured according to the Shear Viscosity Test Method described herein of from about 1 Pascal-Seconds to about 25 Pascal-Seconds and/or from about 2 Pascal-Seconds to about 20 Pascal-Seconds and/or from about 3 Pascal-Seconds to about 10 Pascal-Seconds, as measured at a shear rate of 3,000 $sec^{-1}$ and at the processing temperature (50° C. to 100° C.).

The filament-forming composition may be processed at a temperature of from about 50° C. to about 100° C. and/or from about 65° C. to about 95° C. and/or from about 70° C. to about 90° C. when making fibrous elements from the filament-forming composition.

In one example, the filament-forming composition may comprise at least 20% and/or at least 30% and/or at least 40% and/or at least 45% and/or at least 50% to about 90% and/or to about 85% and/or to about 80% and/or to about 75% by weight of one or more filament-forming materials, one or more active agents, and mixtures thereof. The filament-forming composition may comprise from about 10% to about 80% by weight of a polar solvent, such as water.

In one example, non-volatile components of the filament-forming composition may comprise from about 20% and/or 30% and/or 40% and/or 45% and/or 50% to about 75% and/or 80% and/or 85% and/or 90% by weight based on the total weight of the filament-forming composition. The non-volatile components may be composed of filament-forming materials, such as backbone polymers, active agents and combinations thereof. Volatile components of the filament-forming composition will comprise the remaining percentage and range from 10% to 80% by weight based on the total weight of the filament-forming composition.

In a fibrous element spinning process, the fibrous elements need to have initial stability as they leave the spinning die. Capillary Number is used to characterize this initial stability criterion. At the conditions of the die, the Capillary Number should be at least 1 and/or at least 3 and/or at least 4 and/or at least 5.

In one example, the filament-forming composition exhibits a Capillary Number of from at least 1 to about 50 and/or at least 3 to about 50 and/or at least 5 to about 30 such that the filament-forming composition can be effectively polymer processed into a fibrous element.

“Polymer processing” as used herein means any spinning operation and/or spinning process by which a fibrous element comprising a processed filament-forming material is formed from a filament-forming composition. The spinning operation and/or process may include spun bonding, melt blowing, electro-spinning, rotary spinning, continuous filament producing and/or tow fiber producing operations/processes. A “processed filament-forming material” as used herein means any filament-forming material that has undergone a melt processing operation and a subsequent polymer processing operation resulting in a fibrous element.

The Capillary number is a dimensionless number used to characterize the likelihood of this droplet breakup. A larger capillary number indicates greater fluid stability upon exiting the die. The Capillary number is defined as follows:

$$Ca = \frac{V * \eta}{\sigma}$$

V is the fluid velocity at the die exit (units of Length per Time),
$\eta$ is the fluid viscosity at the conditions of the die (units of Mass per Length*Time),
$\sigma$ is the surface tension of the fluid (units of mass per $Time^2$). When velocity, viscosity, and surface tension are expressed in a set of consistent units, the resulting Capillary number will have no units of its own; the individual units will cancel out.

The Capillary number is defined for the conditions at the exit of the die. The fluid velocity is the average velocity of the fluid passing through the die opening. The average velocity is defined as follows:

$$V = \frac{Vol'}{\text{Area}}$$

Vol'=volumetric flowrate (units of $Length^3$ per Time),
Area=cross-sectional area of the die exit (units of $Length^2$).

When the die opening is a circular hole, then the fluid velocity can be defined as $$V = \frac{Vol'}{\pi * R^2}$$

R is the radius of the circular hole (units of length).

The fluid viscosity will depend on the temperature and may depend of the shear rate. The definition of a shear thinning fluid includes a dependence on the shear rate. The surface tension will depend on the makeup of the fluid and the temperature of the fluid.

In one example, the filament-forming composition may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates and fatty amides, silicones, aminosilicones, fluoropolymers and mixtures thereof.

In one example, the filament-forming composition may comprise one or more antiblocking and/or detackifying agents. Non-limiting examples of suitable antiblocking and/or detackifying agents include starches, modified starches, crosslinked polyvinylpyrrolidone, crosslinked cellulose, microcrystalline cellulose, silica, metallic oxides, calcium carbonate, talc and mica.

Active agents of the present invention may be added to the filament-forming composition prior to and/or during fibrous element formation and/or may be added to the fibrous element after fibrous element formation. For example, a perfume active agent may be applied to the fibrous element and/or fibrous wall material comprising the fibrous element after the fibrous element and/or fibrous wall material according to the present invention are formed. In another example, an enzyme active agent may be applied to the fibrous element and/or fibrous wall material comprising the fibrous element after the fibrous element and/or fibrous wall material according to the present invention are formed. In still another example, one or more particles, which may not be suitable for passing through the spinning process for making the fibrous element, may be applied to the fibrous element and/or fibrous wall material comprising the fibrous element after the fibrous element and/or fibrous wall material according to the present invention are formed.

Extensional Aids

In one example, the fibrous element comprises an extensional aid. Non-limiting examples of extensional aids can include polymers, other extensional aids, and combinations thereof.

In one example, the extensional aids have a weight-average molecular weight of at least about 500,000 Da. In another example, the weight average molecular weight of the extensional aid is from about 500,000 to about 25,000,000, in another example from about 800,000 to about 22,000,000, in yet another example from about 1,000,000 to about 20,000,000, and in another example from about 2,000,000 to about 15,000,000. The high molecular weight extensional aids are especially suitable in some examples of the invention due to the ability to increase extensional melt viscosity and reducing melt fracture.

The extensional aid, when used in a meltblowing process, is added to the composition of the present invention in an amount effective to visibly reduce the melt fracture and capillary breakage of fibers during the spinning process such that substantially continuous fibers having relatively consistent diameter can be melt spun. Regardless of the process employed to produce fibrous elements and/or particles, the extensional aids, when used, can be present from about 0.001% to about 10%, by weight on a dry fibrous element basis and/or dry particle basis and/or dry fibrous wall material basis, in one example, and in another example from about 0.005 to about 5%, by weight on a dry fibrous element basis and/or dry particle basis and/or dry fibrous wall material basis, in yet another example from about 0.01 to about 1%, by weight on a dry fibrous element basis and/or dry particle basis and/or dry fibrous wall material basis, and in another example from about 0.05% to about 0.5%, by weight on a dry fibrous element basis and/or dry particle basis and/or dry fibrous wall material basis.

Non-limiting examples of polymers that can be used as extensional aids can include alginates, carrageenans, pectin, chitin, guar gum, xanthum gum, agar, gum arabic, karaya gum, tragacanth gum, locust bean gum, alkylcellulose, hydroxyalkylcellulose, carboxyalkylcellulose, and mixtures thereof.

Non-limiting examples of other extensional aids can include modified and unmodified polyacrylamide, polyacrylic acid, polymethacrylic acid, polyvinyl alcohol, polyvinylacetate, polyvinylpyrrolidone, polyethylene vinyl acetate, polyethyleneimine, polyamides, polyalkylene oxides including polyethylene oxide, polypropylene oxide, polyethylenepropylene oxide, and mixtures thereof.

Method for Making Fibrous Wall Materials

The fibrous elements of the present invention may be made by any suitable process. A non-limiting example of a suitable process for making the fibrous elements is described below.

Figure 9:
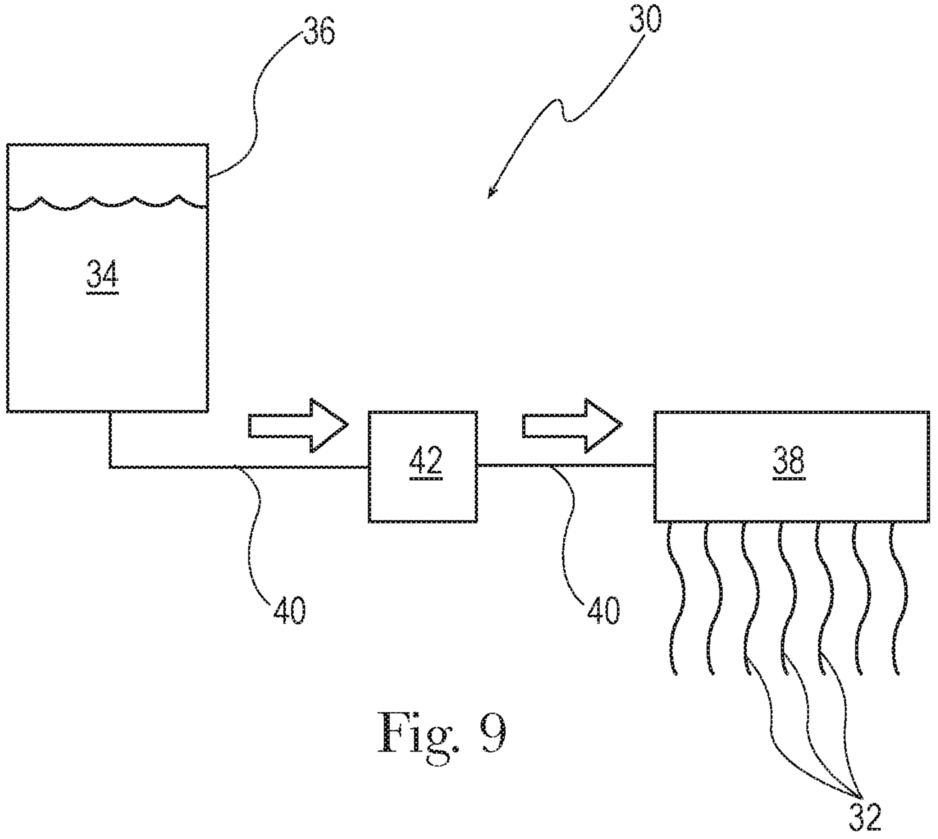
FIG. 9 is a schematic representation of an example of a process for making a fibrous wall material according to the present invention.
Figure 10:
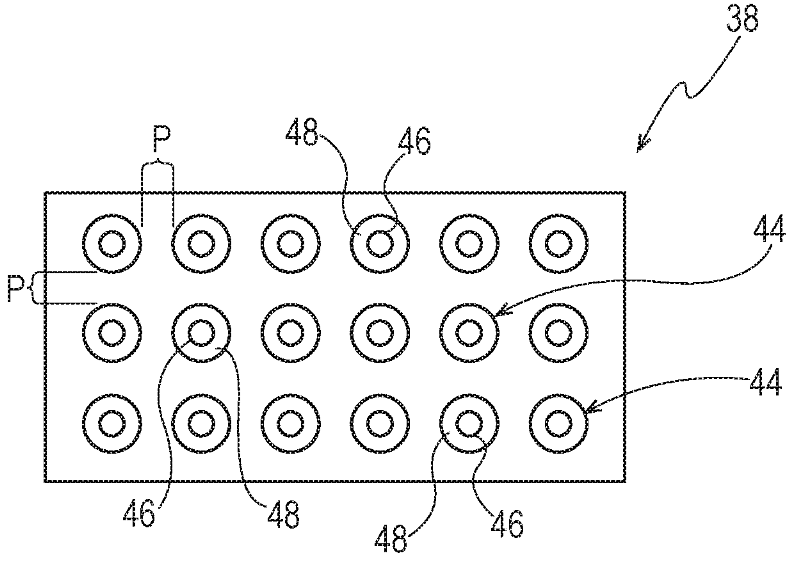
FIG. 10 is a schematic representation of an example of a die suitable for use in the process of FIG. 9.

In one example, as shown in FIGS. 9 and 10, a method 30 for making a fibrous element 32, for example filament, according to the present invention comprises the steps of:

a. providing a filament-forming composition 34, such as from a tank 36, comprising one or more filament-forming materials, and optionally one or more active agents; and b. spinning the filament-forming composition 34, such as via a spinning die 38, into one or more fibrous elements 32, such as filaments, comprising the one or more filament-forming materials and optionally, the one or more active agents, and collecting the fibrous elements 32 onto a collection device (not shown), such as a patterned belt, for example in an inter-entangled manner such that a fibrous wall material is formed.

The filament-forming composition may be transported via suitable piping 40, with or without a pump 42, between the tank 36 and the spinning die 38.

The total level of the one or more filament-forming materials present in the fibrous element 32, when active agents are present therein, may be less than 80% and/or less than 70% and/or less than 65% and/or 50% or less by weight on a dry fibrous element basis and/or dry fibrous wall material basis and the total level of the one or more active agents, when present in the fibrous element may be greater than 20% and/or greater than 35% and/or 50% or greater 65% or greater and/or 80% or greater by weight on a dry fibrous element basis and/or dry fibrous wall material basis.

As shown in FIG. 10, the spinning die 38 may comprise a plurality of fibrous element-forming holes 44 that include a melt capillary 46 encircled by a concentric attenuation fluid hole 48 through which a fluid, such as air, passes to facilitate attenuation of the filament-forming composition 34 into a fibrous element 32 as it exits the fibrous element-forming hole 44.

In one example, during the spinning step, any volatile solvent, such as water, present in the filament-forming composition 34 is removed, such as by drying, as the fibrous element 32 is formed. In one example, greater than 30% and/or greater than 40% and/or greater than 50% of the weight of the filament-forming composition's volatile solvent, such as water, is removed during the spinning step, such as by drying the fibrous element being produced.

The filament-forming composition may comprise any suitable total level of filament-forming materials and any suitable level of active agents so long as the fibrous element produced from the filament-forming composition comprises a total level of filament-forming materials in the fibrous element of from about 5% to 50% or less by weight on a dry fibrous element basis and/or dry particle basis and/or dry fibrous wall material basis and a total level of active agents in the fibrous element of from 50% to about 95% by weight on a dry fibrous element basis and/or dry particle basis and/or dry fibrous wall material basis.

In one example, the filament-forming composition may comprise any suitable total level of filament-forming materials and any suitable level of active agents so long as the fibrous element produced from the filament-forming composition comprises a total level of filament-forming materials in the fibrous element and/or particle of from about 5% to 50% or less by weight on a dry fibrous element basis and/or dry particle basis and/or dry fibrous wall material basis and a total level of active agents in the fibrous element and/or particle of from 50% to about 95% by weight on a dry fibrous element basis and/or dry particle basis and/or dry fibrous wall material basis, wherein the weight ratio of filament-forming material to total level of active agents is 1 or less.

In one example, the filament-forming composition comprises from about 1% and/or from about 5% and/or from about 10% to about 50% and/or to about 40% and/or to about 30% and/or to about 20% by weight of the filament-forming composition of filament-forming materials; from about 1% and/or from about 5% and/or from about 10% to about 50% and/or to about 40% and/or to about 30% and/or to about 20% by weight of the filament-forming composition of active agents; and from about 20% and/or from about 25% and/or from about 30% and/or from about 40% and/or to about 80% and/or to about 70% and/or to about 60% and/or to about 50% by weight of the filament-forming composition of a volatile solvent, such as water. The filament-forming composition may comprise minor amounts of other active agents, such as less than 10% and/or less than 5% and/or less than 3% and/or less than 1% by weight of the filament-forming composition of plasticizers, pH adjusting agents, and other active agents.

The filament-forming composition is spun into one or more fibrous elements and/or particles by any suitable spinning process, such as meltblowing, spunbonding, electro-spinning, and/or rotary spinning. In one example, the filament-forming composition is spun into a plurality of fibrous elements and/or particles by meltblowing. For example, the filament-forming composition may be pumped from a tank to a meltblown spinnerette. Upon exiting one or more of the filament-forming holes in the spinnerette, the filament-forming composition is attenuated with air to create one or more fibrous elements and/or particles. The fibrous elements and/or particles may then be dried to remove any remaining solvent used for spinning, such as the water.

The fibrous elements and/or particles of the present invention may be collected on a belt, such as a patterned belt to form a fibrous wall material comprising the fibrous elements and/or particles.

Non-Limiting Example for Making Fibrous Wall Materials

An example of a fibrous wall material of the present invention may be made as shown in FIGS. 9 and 10. A pressurized tank 36, suitable for batch operation is filled with a suitable filament-forming composition 34 for spinning. A pump 42, such as a Zenith®, type PEP II, having a capacity of 5.0 cubic centimeters per revolution (cc/rev), manufactured by Parker Hannifin Corporation, Zenith Pumps division, of Sanford, N.C., USA may be used to facilitate transport of the filament-forming composition to a spinning die 38. The flow of the filament-forming composition 34 from the pressurized tank 36 to the spinning die 38 may be controlled by adjusting the number of revolutions per minute (rpm) of the pump 42. Pipes 40 are used to connect the pressurized tank 36, the pump 42, and the spinning die 38.

The spinning die 38 shown in FIG. 10 has several rows of circular extrusion nozzles (fibrous element-forming holes 44) spaced from one another at a pitch P of about 1.524 millimeters (about 0.060 inches). The nozzles have individual inner diameters of about 0.305 millimeters (about 0.012 inches) and individual outside diameters of about 0.813 millimeters (about 0.032 inches). Each individual nozzle is encircled by an annular and divergently flared orifice (concentric attenuation fluid hole 48 to supply attenuation air to each individual melt capillary 46. The filament-forming composition 34 extruded through the nozzles is surrounded and attenuated by generally cylindrical, humidified air streams supplied through the orifices.

Attenuation air can be provided by heating compressed air from a source by an electrical-resistance heater, for example, a heater manufactured by Chromalox, Division of Emerson Electric, of Pittsburgh, Pa., USA. An appropriate quantity of steam was added to saturate or nearly saturate the heated air at the conditions in the electrically heated, thermostatically controlled delivery pipe. Condensate was removed in an electrically heated, thermostatically controlled, separator.

The embryonic fibrous elements are dried by a drying air stream having a temperature from about 149° C. (about 300° F.) to about 315° C. (about 600° F.) by an electrical resistance heater (not shown) supplied through drying nozzles and discharged at an angle of about 90° relative to the general orientation of the non-thermoplastic embryonic fibrous elements being spun. The dried embryonic fibrous elements are collected on a collection device, such as, for example, a movable foraminous belt or patterned collection belt. The addition of a vacuum source directly under the formation zone may be used to aid collection of the fibrous elements. The spinning and collection of the fibrous elements produce a fibrous structure comprising inter-entangled fibrous elements, for example filaments. This fibrous structure may be used as a pouch wall material for pouches of the present invention.

Methods for Making a Pouch

The pouch of the present invention may be made by any suitable process known in the art so long as a fibrous wall material, for example a water-soluble fibrous wall material, of the present invention is used to form at least a portion of the pouch.

In one example, a pouch of the present invention may be made using any suitable equipment and method known in the art. For example, single compartment pouches may be made by vertical and/or horizontal form filling techniques commonly known in the art. Non-limiting examples of suitable processes for making water-soluble pouches, albeit with film wall materials, are described in EP 1504994, EP 2258820, and WO02/40351 (all assigned to The Procter & Gamble Company), which are incorporated herein by reference.

In another example, the process for preparing the pouches of the present invention may comprise the step of shaping pouches from a fibrous wall material in a series of molds, wherein the molds are positioned in an interlocking manner. By shaping, it is typically meant that the fibrous wall material is placed onto and into the molds, for example, the fibrous wall material may be vacuum pulled into the molds, so that the fibrous wall material is flush with the inner walls of the molds. This is commonly known as vacuum forming. Another method is thermo-forming to get the fibrous wall material to adopt the shape of the mold.

Thermo-forming typically involves the step of formation of an open pouch in a mold under application of heat, which allows the fibrous wall material used to make the pouches to take on the shape of the molds.

Vacuum-formning typically involves the step of applying a (partial) vacuum (reduced pressure) on a mold which pulls the fibrous wall material into the mold and ensures the fibrous wall material adopts the shape of the mold. The pouch forming process may also be done by first heating the fibrous wall material and then applying reduced pressure, e.g. (partial) vacuum.

The fibrous wall material is typically sealed by any sealing means. For example, by heat sealing, wet sealing or by pressure sealing. In one example, a sealing source is contacted to the fibrous wall material and heat or pressure is applied to the fibrous wall material, and the fibrous wall material is sealed. The sealing source may be a solid object, for example a metal, plastic or wood object. If heat is applied to the fibrous wall material during the sealing process, then said sealing source is typically heated to a temperature of from about 40° C. to about 200° C. If pressure is applied to the fibrous wall material during the sealing process, then the sealing source typically applies a pressure of from about $1\times10^4$ $Nm^{-2}$ to about $1\times10^6$ $Nm^{-2}$, to the fibrous wall material.

In another example, the same piece of fibrous wall material may be folded, and sealed to form the pouches. Typically more than one piece of fibrous wall material is used in the process. For example, a first piece of the fibrous wall material may be vacuum pulled into the molds so that the fibrous wall material is flush with the inner walls of the molds. A second piece of fibrous wall material may be positioned such that it at least partially overlaps and/or completely overlaps, with the first piece of fibrous wall material. The first piece of fibrous wall material and second piece of fibrous wall material are sealed together. The first piece of fibrous wall material and second piece of fibrous wall material can be the same or different.

In another example of making pouches of the present invention, a first piece of fibrous wall material may be vacuum pulled into the molds so that the fibrous wall material is flush with the inner walls of the molds. A composition, such as one or more active agents and/or a detergent composition, may be added, for example poured, into the open pouches in the molds, and a second piece of fibrous wall material may be placed over the active agents and/or detergent composition and in contact with the first piece of fibrous wall material and the first piece of fibrous wall material and second piece of fibrous wall material are sealed together to form pouches, typically in such a manner as to at least partially enclose and/or completely enclose its internal volume and the active agents and/or detergent composition within its internal volume.

In another example, the pouch making process may be used to prepare pouches which have an internal volume that is divided into more than one compartment, typically known as a multi-compartment pouches. In the multi-compartment pouch process, the fibrous wall material is folded at least twice, or at least three pieces of pouch wall materials (at least one of which is a fibrous pouch wall material, for example a water-soluble fibrous pouch wall material) are used, or at least two pieces of pouch wall materials (at least one of which is a fibrous pouch wall material, for example a water-soluble fibrous pouch wall material) are used wherein at least one piece of pouch wall material is folded at least once. The third piece of pouch wall material, when present, or a folded piece of pouch wall material, when present, creates a barrier layer that, when the pouch is sealed, divides the internal volume of said pouch into at least two compartments.

In another example, a process for making a multi-compartment pouch comprises fitting a first piece of the fibrous wall material into a series of molds, for example the first piece of fibrous wall material may be vacuum pulled into the molds so that the pouch wall material is flush with the inner walls of the molds. Active agents are typically poured into the open pouch formed by the first piece of fibrous wall material in the molds. A pre-sealed compartment made of a pouch wall material can then be placed over the molds containing the composition. These pre-sealed compartments and said first piece of fibrous wall material may be sealed together to form multi-compartment pouches, for example, dual-compartment pouches.

The pouches obtained from the processes of the present invention are water-soluble. The pouches are typically closed structures, made of a fibrous wall material described herein, typically enclosing an internal volume which may comprise active agents and/or a detergent composition. The fibrous wall materials are suitable to hold active agents, e.g. without allowing the release of the active agents from the pouch prior to contact of the pouch with water. The exact execution of the pouch will depend on for example, the type and amount of the active agent in the pouch, the number of compartments in the pouch, the characteristics required from the pouch to hold, protect and deliver or release the active agents.

For multi-compartment pouches, the active agents and/or compositions contained in the different compartments may be the same or different. For example, incompatible ingredients may be contained in different compartments.

The pouches of the present invention may be of such a size that they conveniently contain either a unit dose amount of the active agents therein, suitable for the required operation, for example one wash, or only a partial dose, to allow the consumer greater flexibility to vary the amount used, for example depending on the size and/or degree of soiling of the wash load. The shape and size of the pouch is typically determined, at least to some extent, by the shape and size of the mold.

The multi-compartment pouches of the present invention may further be packaged in an outer package. Such an outer package may be a see-through or partially see-through container, for example a transparent or translucent bag, tub, carton or bottle. The pack can be made of plastic or any other suitable material, provided the material is strong enough to protect the pouches during transport. This kind of pack is also very useful because the user does not need to open the pack to see how many pouches remain in the package. Alternatively, the package may have non-see-through outer packaging, perhaps with indicia or artwork representing the visually-distinctive contents of the package.

Non-Limiting Example for Making a Pouch

An example of a pouch of the present invention may be made as follows. Cut two layers of fibrous wall materials at least twice the size of the pouch size intended to make. For example if finished pouch size has a planar footprint of about 2 inches×2 inches, then the pouch wall materials are cut 5 inches×5 inches. Next, lay both layers on top of one another on the heating element of an impulse sealer (Impulse Sealer model TISH-300 from TEW Electric Heating Equipment CO., LTD, 7F, No. 140, Sec. 2, Nan Kang Road, Taipei, Taiwan). The position of the layers on the heating element should be where a side closure seam is to be created. Close the sealer arm for 1 second to seal the two layers together. In a similar way, seal two more sides to create two additional side closure seams. With the three sides sealed, the two pouch wall materials form a pocket. Next, add the appropriate amount of powder into the pocket and then seal the last side to create the last side closure seam. A pouch is now formed. For most fibrous wall materials which are less than 0.2 mm thick, heating dial setting of 4 and heating time 1 second is used. Depending on the fibrous wall materials, heating temperature and heating time might have to be adjusted to realize a desirable seam. If the temperature is too low or the heating time is not long enough, the fibrous wall material may not sufficiently melt and the two layers come apart easily; if the temperature is too high or the heating time is too long, pin holes may form at the sealed edge. One should adjust the sealing equipment conditions so as to the layers to melt and form a seam but not introduce negatives such as pin holes on the seam edge. Once the seamed pouch is formed, a scissor is used to trim off the excess material and leave a 1-2 mm edge on the outside of the seamed pouch.

Methods of Use

The pouches of the present invention comprising one or more active agents, for example one or more fabric care active agents according the present invention may be utilized in a method for treating a fabric article. The method of treating a fabric article may comprise one or more steps selected from the group consisting of: (a) pre-treating the fabric article before washing the fabric article; (b) contacting the fabric article with a wash liquor formed by contacting the pouch with water; (c) contacting the fabric article with the pouch in a dryer; (d) drying the fabric article in the presence of the pouch in a dryer; and (e) combinations thereof.

In some embodiments, the method may further comprise the step of pre-moistening the pouch prior to contacting it to the fabric article to be pre-treated. For example, the pouch can be pre-moistened with water and then adhered to a portion of the fabric article comprising a stain that is to be pre-treated. Alternatively, the fabric article may be moistened and the pouch placed on or adhered thereto. In some embodiments, the method may further comprise the step of selecting of only a portion of the pouch for use in treating a fabric article. For example, if only one fabric care article is to be treated, a portion of the pouch may be cut and/or torn away and either placed on or adhered to the fabric article or placed into water to form a relatively small amount of wash liquor which is then used to pre-treat the fabric article. In this way, the user may customize the fabric treatment method according to the task at hand. In some embodiments, at least a portion of a pouch may be applied to the fabric article to be treated using a device. Exemplary devices include, but are not limited to, brushes, sponges and tapes. In yet another embodiment, the pouch may be applied directly to the surface of the fabric article. Any one or more of the aforementioned steps may be repeated to achieve the desired fabric treatment benefit for a fabric article.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, sheet, and/or single or multi-compartment products. All tests are conducted under the same environmental conditions and in such conditioned room. Do not test samples that have defects such as wrinkles, tears, holes, and like. Samples conditioned as described herein are considered dry samples (such as "dry filaments") for testing purposes. All instruments are calibrated according to manufacturer's specifications.

Basis Weight Test Method

Basis weight of a fibrous wall material is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 $ft^2$ or $g/m^2$ as follows:

Basis Weight=(Mass of stack)/[(Area of 1 square in stack)×(No. of squares in stack)]

For example,

Basis Weight (lbs/3000 $ft^2$)=[[Mass of stack (g)/453.6 (g/lbs)]/[12.25 ($in^2$)/144 ($in^2/ft^2$)×12]]×3000 or,

Basis Weight ($g/m^2$)=Mass of stack (g)/[79.032 ($cm^2$)/10,000 ($cm^2/m^2$)×12]

Report result to the nearest 0.1 lbs/3000 $ft^2$ or 0.1 $g/m^2$. Sample dimensions can be changed or varied using a similar precision cutter as mentioned above, so as at least 100 square inches of sample area in stack.

Water Content Test Method

The water (moisture) content present in a fibrous element and/or particle and/or fibrous wall material and/or pouch is measured using the following Water Content Test Method. A fibrous element and/or particle and/or fibrous wall material or portion thereof in the form of a pre-cut sheet and/or pouch ("sample") is placed in a conditioned room at a temperature of 23° C.±1.0° C. and a relative humidity of 50%±2% for at least 24 hours prior to testing. Each fibrous wall material sample and/or pouch has an area of at least 4 square inches, but small enough in size to fit appropriately on the balance weighing plate. Under the temperature and humidity conditions mentioned above, using a balance with at least four decimal places, the weight of the sample is recorded every five minutes until a change of less than 0.5% of previous weight is detected during a 10 minute period. The final weight is recorded as the "equilibrium weight". Within 10 minutes, the samples are placed into the forced air oven on top of foil for 24 hours at 70° C.±2° C. at a relative humidity of 4%±2% for drying. After the 24 hours of drying, the sample is removed and weighed within 15 seconds. This weight is designated as the "dry weight" of the sample.

The water (moisture) content of the sample is calculated as follows:

$$\%\ \text{Water in sample} = 100\% \times \frac{(\text{Equilibrium weight of sample} - \text{Dry weight of sample})}{\text{Dry weight of sample}}$$

The % Water (moisture) in sample for 3 replicates is averaged to give the reported % Water (moisture) in sample. Report results to the nearest 0.1%.

Rupture Test Method

Figure 13:
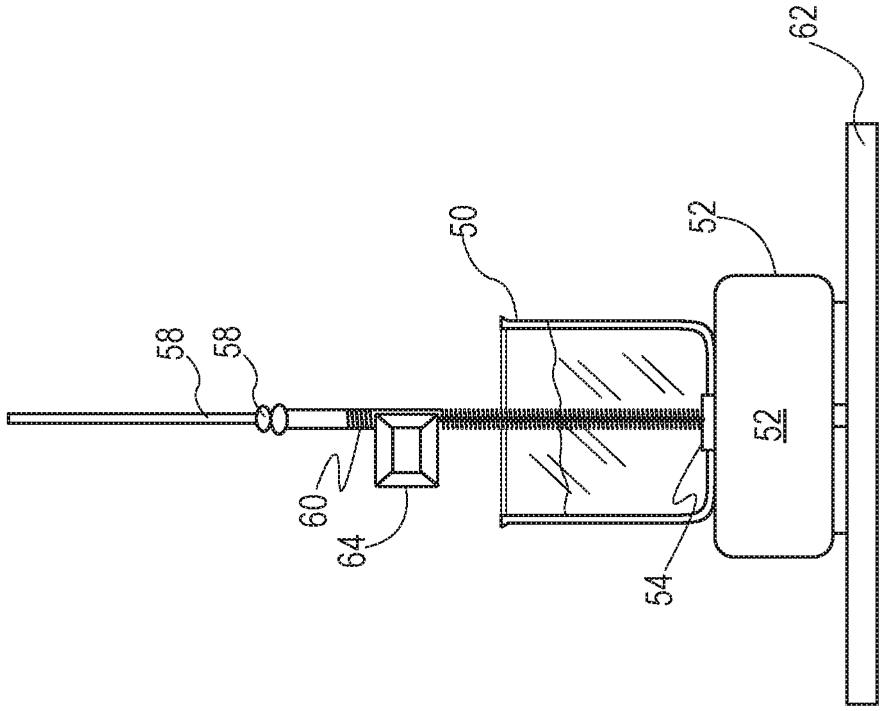
FIG. 13 is a side elevational view of FIG. 11.
Figure 12:
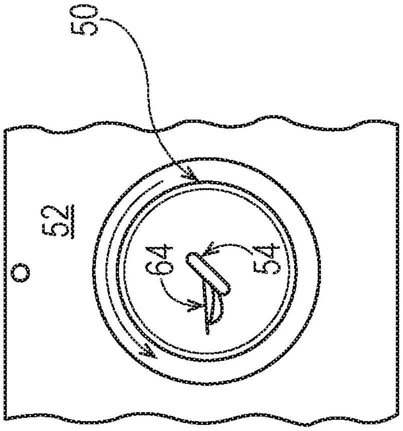
FIG. 12 is a partial top view of FIG. 11.
Figure 11:
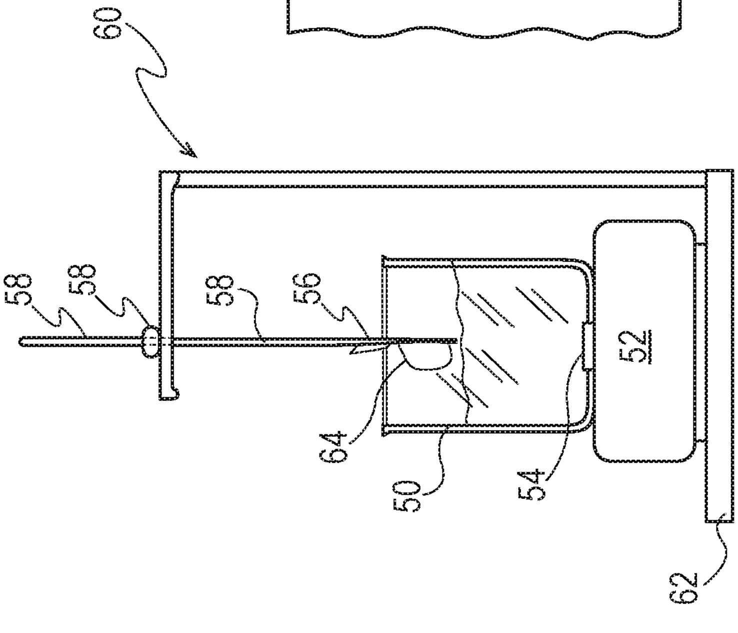
FIG. 11 is a front elevational view of a set-up for the Rupture Test Method.

Apparatus and Materials:

With reference to FIGS. 11-13:

2000 mL glass beaker 50 (approximately 7.5 inch tall by 5.5 inch in diameter)

Magnetic Stirrer Plate 52 (Labline, Melrose Park, IL, Model No. 1250 or equivalent)

Magnetic Stirring Rod 54 (2 inch long by 3/8 inch in diameter, Teflon coated)

Thermometer (1 to 100° C.+/−1° C.)

1.25 inch paper binder clip

Alligator clamp (about one inch long) 56

Depth adjuster rod 58 and holder 60 with base 62

Timer (accurate to at least 0.1 second)

Deionized water (equilibrated at 23° C.±1° C.)

Sample Preparation:

Pouch samples are equilibrated at 23° C.±1° C. and 50%±2% relative humidity for at least 24 hours prior to testing. The rupture test is conducted under this temperature and relative humidity condition as well.

Equipment Setup:

As shown in FIGS. 11-13, a 2000 mL glass beaker 50 is filled with 1600±5 mL deionized water and placed on top of a magnetic stirrer plate 52. A magnetic stirring rod 54 is placed at the bottom of the beaker 50. The stirring speed is adjusted so that a steady vortex develops at the center of the beaker 50 with the vortex bottom at the 1200 mL mark.

A trial run may be necessary to ensure the depth adjuster rod is set up properly for the particular pouch to be tested. A pouch 64 is secured by its edge into the clasp of a paper binder clip, which is hung onto an alligator clamp 56 with one of its two wire handles. The alligator clamp 56 is soldiered to the end of a depth adjuster rod 58. The depth adjuster rod 58 is set up in a way, so that when the paper binder clip is lowered into the water, the entire pouch 64 is completely submerged in the water at the center of the beaker 50, the top of the pouch 64 is at the bottom of the vortex, and the bottom of the pouch 64 is not in direct contact with the stirring bar 54. Due to the different dimensions of different pouch samples, the depth adjuster rod 58 may need to be adjusted for each kind of pouch sample.

Test Protocol:

The pouch 64, which is attached to the paper binder clip, is dropped into the water in one motion and the timer is started immediately. The pouch 64 is closely monitored visually. The Rupture Time is defined as when the pouch initially breaks apart, releasing its contents, such as powders, into the water, which means the pouch ruptures.

For clarity purposes, the dissolving of a coating present on a pouch's wall material does not satisfy the "breaking apart" condition even if the contents of the pouch are released from the pouch. In such a case, continue closely monitoring visually to determine if the pouch wall material breaks apart. If the pouch wall material is water-insoluble, then by default the pouch will have no Rupture Time and thus will not rupture.

A pouch is said to have an instantaneous Average Rupture Time if it breaks apart immediately upon contact with the water.

Three replicates of each sample are measured and the Average Rupture Time is reported to within +/−0.1 seconds.

Tensile Test Method

Apparatus and Materials:

Box cutter or utility knife

Scissors 1 inch Precision Die Cutter (model No. JDC25 made by Thwing-Albert Instrument Company, 14 W Collings Ave, West Berlin, NJ 08091) or equivalent Sample Preparation:

Using a box cutter, a corner of the pouch is cut open along its edge. After most of the pouch content is emptied out, using a pair of scissors, a sample of the pouch wall material is cut out along the pouch edge. The pouch wall material is then gently wiped clean to remove any residue. Any damage to the pouch wall material, such as stretching, scraping, pinching, puncturing, is avoided during sample preparation step. If the pouch wall material is damaged (i.e., torn, stretched, cut, punctured, etc.) as a result of separating the wall material from the pouch, the sample is discarded and another undamaged one is prepared.

The tensile property of pouch wall material may depend on the direction of applied deformation in relative to its manufacturing orientation, i.e. machine direction (MD) and cross direction (CD). If the MD and CD are not apparent, the longer axial direction parallel to one edge of the pouch is assumed to be the MD and the orthogonal direction is assumed to be the CD. Or if the emptied pouch is almost square, again, assume an axial direction parallel to one edge of the pouch is assumed to be the MD and the orthogonal direction is assumed to be the CD.

The pouch wall samples are cut to a dimension of 25.4 mm (1 inch) by 12.7 mm (0.5 inch) using a precision die cutter. The samples are equilibrated at 20±1° C. and 40%±2% relative humidity for at least 24 hours prior to testing. The tensile tests are performed in accordance with ASTM D882-02 at 23° C.±1° C. and 50%±2% relative humidity, along with the exceptions and/or conditions set forth below.

Test Protocol:

Due to the size of a typical pouch, initial gauge length is chosen to be 6.35 mm (0.25 inch) and gauge width is 25.4 mm (1 inch). Tensile Strength and Elongation at Break are measured using a constant rate extension tensile tester with computer interface, such as an Instron Tension tester Model 5569 (made by Instron Corporation, 825 University Ave, Norwood, MA 02062) equipped with the Bluehill® Materials Testing software version 2.18. Testing speed is set at 500 mm/minute. Both the upper movable and lower stationary pneumatic jaws are fitted with smooth stainless steel faced grips, 25.4 mm in height and wider than the width of the test specimen. An air pressure of about 60 psi is supplied to the jaws. A suitable load cell is chosen so that the calculated tensile strength is accurate to +/−0.01 kN/m.

Tensile Strength is defined as the maximum peak force (kN) divided by the sample width (m) and reported as kN/m to the +/−0.01 kN/m.

Elongation at Break is defined as the extension where the force has dropped to 10% of its maximum divided by the initial gauge length multiplied by 100 and reported as % to +/−0.1%.

Three replicates of each sample along the MD and the CD are tested.

Calculations:

Geometric Mean Tensile Strength=Square Root of [MD Tensile Strength (kN/m)×CD Tensile Strength (kN/m)]

Geometric Mean Elongation at Break=Square Root of [MD Elongation at Break (%)×CD Elongation at Break (%)]

Shake Test Method

Apparatus and Materials:

850 micron sieve (8 inch in diameter)

Solid pan (8 inch in diameter) that fits underneath the sieve

Lab-Line Orbit Environ Shaker Model No. 3528 (made by Lab-Line Instrument Inc., Melrose Park, IL 60160) or the equivalent Balance (accurate to 0.0001 gram)

Sample Preparation:

Pouch samples are equilibrated at 20±1° C. and 40%±2% relative humidity for at least 24 hours prior to testing. The shake test is conducted under the same temperature and relative humidity condition.

Test Protocol:

Before the shake test is conducted, the mass of the pouch is measured to within +/−0.1 mg. The pouch sample is placed at the center of the sieve, which sits on the solid pan. Both the sieve and the pan are placed onto the shaker plate. The shake rate is set to 150-170 rpm for 10 minutes. The mass of the pouch is measured again after the shake test to within +/−0.1 mg.

Three replicates of each sample are tested. The percent weight loss is calculated based on the mass of the pouch before and after shaking and is reported to +/−0.1%.

Median Particle Size Test Method

This test method must be used to determine median particle size.

The median particle size test is conducted to determine the median particle size of the seed material using ASTM D 502-89, "Standard Test Method for Particle Size of Soaps and Other Detergents", approved May 26, 1989, with a further specification for sieve sizes used in the analysis. Following section 7, "Procedure using machine-sieving method," a nest of clean dry sieves containing U.S. Standard (ASTM E 11) sieves #8 (2360 μm), #12 (1700 μm), #16 (1180 μm), #20 (850 μm), #30 (600 μm), #40 (425 μm), #50 (300 μm), #70 (212 μm), #100 (150 μm) is required. The prescribed Machine-Sieving Method is used with the above sieve nest. The seed material is used as the sample. A suitable sieve-shaking machine can be obtained from W. S. Tyler Company of Mentor, Ohio, U.S.A.

The data are plotted on a semi-log plot with the micron size opening of each sieve plotted against the logarithmic abscissa and the cumulative mass percent ($Q_3$) plotted against the linear ordinate. An example of the above data representation is given in ISO 9276-1:1998, "Representation of results of particle size analysis—Part 1: Graphical Representation", Figure A.4. The seed material median particle size ($D_{50}$), for the purpose of this invention, is defined as the abscissa value at the point where the cumulative mass percent is equal to 50 percent, and is calculated by a straight line interpolation between the data points directly above (a50) and below (b50) the 50% value using the following equation:

$$D_{50}=10\hat{}[\mathrm{Log}(D_{a50})-(\mathrm{Log}(D_{a50})-\mathrm{Log}(D_{b50}))*(Q_{a50}-50\%)/(Q_{a50}-Q_{b50})]$$

where $Q_{a50}$ and $Q_{b50}$ are the cumulative mass percentile values of the data immediately above and below the $50^{th}$ percentile, respectively; and $D_{a50}$ and $D_{b50}$ are the micron sieve size values corresponding to these data.

In the event that the $50^{th}$ percentile value falls below the finest sieve size (150 μm) or above the coarsest sieve size (2360 μm), then additional sieves must be added to the nest following a geometric progression of not greater than 1.5, until the median falls between two measured sieve sizes.

The Distribution Span of the Seed Material is a measure of the breadth of the seed size distribution about the median. It is calculated according to the following:

$$\text{Span}=(D_{84}/D_{50}+D_{50}/D_{16})/2$$

Where $D_{50}$ is the median particle size and $D_{84}$ and $D_{16}$ are the particle sizes at the sixteenth and eighty-fourth percentiles on the cumulative mass percent retained plot, respectively.

In the event that the $D_{16}$ value falls below the finest sieve size (150 μm), then the span is calculated according to the following:

$$\text{Span}=(D_{84}/D_{50}).$$

In the event that the $D_{84}$ value falls above the coarsest sieve size (2360 μm), then the span is calculated according to the following:

$$\text{Span}=(D_{50}/D_{16}).$$

In the event that the $D_{16}$ value falls below the finest sieve size (150 μm) and the $D_{84}$ value falls above the coarsest sieve size (2360 μm), then the distribution span is taken to be a maximum value of 5.7.

Diameter Test Method

The diameter of a discrete fibrous element or a fibrous element within a fibrous wall material is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling to get actual reading in μm. For fibrous elements within a fibrous wall material, several fibrous element are randomly selected across the sample of the fibrous wall material using the SEM or the optical microscope. At least two portions of the fibrous wall material are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters.

Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in μm) of an individual circular fibrous element as di.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

Thickness Test Method

Thickness of a fibrous wall material is measured by cutting 5 samples of a fibrous wall material sample such that each cut sample is larger in size than a load foot loading surface of a VIR Electronic Thickness Tester Model II available from Thwing-Albert Instrument Company, Philadelphia, PA Typically, the load foot loading surface has a circular surface area of about 3.14 in$^2$. The sample is confined between a horizontal flat surface and the load foot loading surface. The load foot loading surface applies a confining pressure to the sample of 15.5 g/cm$^2$. The thickness of each sample is the resulting gap between the flat surface and the load foot loading surface. The thickness is calculated as the average thickness of the five samples. The result is reported in millimeters (mm).

Shear Viscosity Test Method

The shear viscosity of a filament-forming composition of the present invention is measured using a capillary rheometer, Goettfert Rheograph 6000, manufactured by Goettfert USA of Rock Hill SC, USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the filament-forming composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta=K\gamma^{n-1}$, wherein K is the material's viscosity constant, n is the material's thinning index and $\gamma$ is the shear rate. The reported apparent shear viscosity of the filament-forming composition herein is calculated from an interpolation to a shear rate of 3,000 sec$^{-1}$ using the power law relation.

Weight Average Molecular Weight

The weight average molecular weight (Mw) of a material, such as a polymer, is determined by Gel Permeation Chromatography (GPC) using a mixed bed column. A high performance liquid chromatograph (HPLC) having the following components: Millenium®, Model 600E pump, system controller and controller software Version 3.2, Model 717 Plus autosampler and CHM-009246 column heater, all manufactured by Waters Corporation of Milford, MA, USA, is utilized. The column is a PL gel 20 μm Mixed A column (gel molecular weight ranges from 1,000 g/mol to 40,000,000 g/mol) having a length of 600 mm and an internal diameter of 7.5 mm and the guard column is a PL gel 20 μm, 50 mm length, 7.5 mm ID. The column temperature is 55° C. and the injection volume is 200 μL. The detector is a DAWN® Enhanced Optical System (EOS) including Astra® software, Version 4.73.04 detector software, manufactured by Wyatt Technology of Santa Barbara, CA, USA, laser-light scattering detector with K5 cell and 690 nm laser. Gain on odd numbered detectors set at 101. Gain on even numbered detectors set to 20.9. Wyatt Technology's Optilab® differential refractometer set at 50° C. Gain set at 10. The mobile phase is HPLC grade dimethylsulfoxide with 0.1% w/v LiBr and the mobile phase flow rate is 1 mL/min, isocratic. The run time is 30 minutes.

A sample is prepared by dissolving the material in the mobile phase at nominally 3 mg of material/1 mL of mobile phase. The sample is capped and then stirred for about 5 minutes using a magnetic stirrer. The sample is then placed in an 85° C. convection oven for 60 minutes. The sample is then allowed to cool undisturbed to room temperature. The sample is then filtered through a 5 μm Nylon membrane, type Spartan-25, manufactured by Schleicher & Schuell, of Keene, NH, USA, into a 5 milliliter (mL) autosampler vial using a 5 mL syringe.

For each series of samples measured (3 or more samples of a material), a blank sample of solvent is injected onto the column. Then a check sample is prepared in a manner similar to that related to the samples described above. The check sample comprises 2 mg/mL of pullulan (Polymer Laboratories) having a weight average molecular weight of 47,300 g/mol. The check sample is analyzed prior to analyzing each set of samples. Tests on the blank sample, check sample, and material test samples are run in duplicate. The final run is a run of the blank sample. The light scattering detector and differential refractometer is run in accordance with the "Dawn EOS Light Scattering Instrument Hardware Manual" and "Optilab® DSP Interferometric Refractometer Hardware Manual," both manufactured by Wyatt Technology Corp., of Santa Barbara, CA, USA, and both incorporated herein by reference.

The weight average molecular weight of the sample is calculated using the detector software. A dn/dc (differential change of refractive index with concentration) value of 0.066 is used. The baselines for laser light detectors and the refractive index detector are corrected to remove the contributions from the detector dark current and solvent scattering. If a laser light detector signal is saturated or shows excessive noise, it is not used in the calculation of the molecular mass. The regions for the molecular weight characterization are selected such that both the signals for the 90°□ detector for the laser-light scattering and refractive index are greater than 3 times their respective baseline noise levels. Typically the high molecular weight side of the chromatogram is limited by the refractive index signal and the low molecular weight side is limited by the laser light signal.

The weight average molecular weight can be calculated using a "first order Zimm plot" as defined in the detector software. If the weight average molecular weight of the sample is greater than 1,000,000 g/mol, both the first and second order Zimm plots are calculated, and the result with the least error from a regression fit is used to calculate the molecular mass. The reported weight average molecular weight is the average of the two runs of the material test sample.

Fibrous Element Composition Test Method

In order to prepare fibrous elements for fibrous element composition measurement, the fibrous elements must be conditioned by removing any coating compositions and/or materials present on the external surfaces of the fibrous elements that are removable. An example of a method for doing so is washing the fibrous elements 3 times with a suitable solvent that will remove the external coating while leaving the fibrous elements unaltered. The fibrous elements are then air dried at 23° C.±1.0° C. until the fibrous elements comprise less than 10% moisture. A chemical analysis of the conditioned fibrous elements is then completed to determine the compositional make-up of the fibrous elements with respect to the filament-forming materials and the active agents and the level of the filament-forming materials and active agents present in the fibrous elements.

The compositional make-up of the fibrous elements with respect to the filament-forming material and the active agents can also be determined by completing a cross-section analysis using TOF-SIMs or SEM. Still another method for determining compositional make-up of the fibrous elements uses a fluorescent dye as a marker. In addition, as always, a manufacturer of fibrous elements should know the compositions of their fibrous elements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose product, wherein the unit dose product comprises a pouch comprising a water-soluble fibrous wall material comprising a plurality of fibrous elements comprising one or more filament-forming materials comprising polyvinyl alcohol and one or more active agents present within the fibrous elements, wherein the water-soluble fibrous wall material defines an internal volume of the pouch, wherein one or more active agents in particle form are present within the internal volume of the pouch, wherein at least one of the one or more active agents in particle form is released from the internal volume of the pouch when the unit dose product ruptures when exposed to conditions of intended use, and wherein the one or more active agents within the internal volume of the pouch comprise one or more of the following: personal cleansing agents, personal conditioning agents, hair care agents, hair colorant agents, hair conditioning agents, skin care agents, sunscreen agents, skin conditioning agents and mixtures thereof;

wherein the unit dose product exhibits an Average Rupture Time of less than 240 seconds as measured according to the Rupture Test Method;

wherein the unit dose product exhibits a % Weight Loss of less than 10% as measured according to the Shake Test Method;

wherein the fibrous wall material exhibits a Geometric Mean (GM) Tensile Strength of greater than 0.1 kN/m, and a Geometric Mean (GM) Elongation at Break of less than 1000%.

2. The unit dose product according to claim 1 wherein the plurality of fibrous elements comprises one or more filaments.

3. The unit dose product according to claim 1 wherein the plurality of fibrous elements further comprise one or more additional filament-forming materials comprising a hydroxyl polymer is selected from the group consisting of: pullulan, hydroxypropylmethyl cellulose, hydroxyethyl cellulose, hydroxypropyl cellulose, carboxymethyl cellulose, sodium alginate, xanthan gum, tragacanth gum, guar gum, acacia gum, Arabic gum, polyacrylic acid, dextrin, pectin, chitin, collagen, gelatin, zein, gluten, soy protein, casein, starch, modified starch, hemicellulose, modified hemicellulose, proteins, chitosan, modified chitosan, polyethylene glycol, tetramethylene ether glycol, hydroxymethyl cellulose, and mixtures thereof.

4. The unit dose product according to claim 1 wherein the unit dose product exhibits a water content of from 0% to 20% as measured according to the Water Content Test Method.

5. The unit dose product according to claim 1 wherein the water-soluble fibrous wall material is an apertured, water-soluble fibrous wall material.

6. The unit dose product according to claim 1 wherein at least one of the one or more active agents within the internal volume of the pouch comprises one or more of the following: hair care agents, hair colorant agents, hair conditioning agents and mixtures thereof.

7. The unit dose product according to claim 6 wherein at least one of the one or more active agents within the internal volume of pouch comprises one or more hair conditioning agents.

8. The unit dose product according to claim 6 wherein at least one of the one or more hair care agents comprises one or more shampoo agents.

9. The unit dose product according to claim 1 wherein at least one of the one or more active agents within the internal volume of the pouch comprises one or more surfactants.

10. The unit dose product according to claim 9 wherein at least one of the one or more surfactants comprises one or more anionic surfactants.

11. The unit dose product according to claim 9 wherein at least one of the one or more surfactants comprises one or more cationic surfactants.

12. The unit dose product according to claim 1 wherein the unit dose product further comprises one or more of the following: fatty acids, fatty acid salts, fatty alcohols, fatty esters, sulfonated fatty acid esters, fatty amine acetates and fatty amides, silicones, aminosilicones, fluoropolymers and mixtures thereof.

13. The unit dose product according to claim 12 wherein the unit dose product comprises one or more of the following: silicones, aminosilicones and mixtures thereof.

14. The unit dose product according to claim 1 wherein the unit dose product further comprises citric acid.

15. The unit dose product according to claim 1 wherein the unit dose product comprises at least 5 g of the one or more active agents within the internal volume of the pouch.

16. A method for making a unit dose product according to claim 1, wherein the method comprises the steps of:

a. providing a water-soluble fibrous wall material;

b. forming a pouch defining an internal volume from the water-soluble fibrous wall material; and c. adding one or more active agents to the internal volume of the pouch and sealing the pouch to make the unit dose product.

17. A method for making a unit dose product according to claim 1 comprising the steps of:

a. providing a fibrous wall material comprising a plurality of fibrous elements, wherein at least one of the fibrous elements comprises one or more filament-forming materials and one or more active agents present within the fibrous element;

b. forming a pouch defining an internal volume from the fibrous wall material; and c. adding one or more active agents to the internal volume of the pouch to make the unit dose product.

* * * * *